(12) United States Patent
Kitagawa

(10) Patent No.: US 11,600,086 B2
(45) Date of Patent: Mar. 7, 2023

(54) DICTIONARY LEARNING DEVICE, DICTIONARY LEARNING METHOD, AND PROGRAM STORAGE MEDIUM

(71) Applicant: NEC Corporation, Tokyo (JP)

(72) Inventor: Takeharu Kitagawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 294 days.

(21) Appl. No.: 17/056,984

(22) PCT Filed: May 21, 2019

(86) PCT No.: PCT/JP2019/020088
§ 371 (c)(1),
(2) Date: Nov. 19, 2020

(87) PCT Pub. No.: WO2019/225595
PCT Pub. Date: Nov. 28, 2019

(65) Prior Publication Data
US 2021/0150185 A1    May 20, 2021

(30) Foreign Application Priority Data

May 23, 2018 (JP) .............................. JP2018-098700
Sep. 26, 2018 (JP) .............................. JP2018-179775

(51) Int. Cl.
*G06N 20/00* (2019.01)
*G06V 20/64* (2022.01)

(52) U.S. Cl.
CPC ............. *G06V 20/64* (2022.01); *G06N 20/00* (2019.01)

(58) Field of Classification Search
None
See application file for complete search history.

(56) References Cited

U.S. PATENT DOCUMENTS

| 2018/0276492 A1* | 9/2018 | Feng | G06T 7/0002 |
| 2021/0005024 A1* | 1/2021 | Mizuno | G06T 19/006 |
| 2021/0232846 A1* | 7/2021 | Feng | G06T 3/4007 |

FOREIGN PATENT DOCUMENTS

| JP | 2002-342758 A | 11/2002 |
| JP | 2003-099777 A | 4/2003 |

(Continued)

OTHER PUBLICATIONS

International Search Report for PCT Application No. PCT/JP2019/020088, dated Aug. 27, 2019.

(Continued)

*Primary Examiner* — Dov Popovici
(74) *Attorney, Agent, or Firm* — Sughrue Mion, PLLC

(57) ABSTRACT

A reference data extraction unit extracts, from a photographic image from an imaging device that captures an image of an object to be recognized, an image of a reference image region serving as a reference and containing a detection subject in the object. A expanded data extraction unit extracts from the photographic image an image of an expanded-image region, which is an image region that includes the reference image region and is larger than the reference image region. A reduced data extraction unit extracts from the photographic image an image of a reduced-image region, which is an image region that includes the detection subject and is smaller than the reference image region, with the result that a portion of the object is outside of the region. A learning unit uses the extracted images of the image region to learn a dictionary.

8 Claims, 21 Drawing Sheets

(56) References Cited

FOREIGN PATENT DOCUMENTS

| JP | 2005-250863 A | 9/2005 |
|----|---------------|--------|
| JP | 2017-004052 A | 1/2017 |
| JP | 2018-060296 A | 4/2018 |
| JP | 2018-067149 A | 4/2018 |

OTHER PUBLICATIONS

English translation of Written opinion for PCT Application No. PCT/JP2019/020088, dated Aug. 27, 2019.

* cited by examiner

| SIZE | | SHAPE | | STEREOSCOPIC VIEW | |
|---|---|---|---|---|---|
| LARGE |  | ARMS UP (FRONT FACE) |  | SIDE FACE |  |
| MEDIUM |  | | | BACK FACE | |
| | | ARMS UP (SIDE FACE) |  | OBLIQUE | |
| SMALL |  | | | TOP FACE |  |

DICTIONARY LEARNING DEVICE, DICTIONARY LEARNING METHOD, AND PROGRAM STORAGE MEDIUM

This application is a National Stage Entry of PCT/JP2019/020088 filed on May 21, 2019, which claims priority from Japanese Patent Application 2018-098700 filed on May 23, 2018 and 2018-179775 filed on Sep. 26, 2018, the contents of all of which are incorporated herein by reference, in their entirety.

TECHNICAL FIELD

The present invention relates to a technique for learning a dictionary including reference data to be referred to when a computer executes processing.

BACKGROUND ART

There is a case where the length or the like of an object to be observed is measured by using a captured image of the object to be observed imaged by an imaging device. In such a case, when the length or the like of the object is measured from the captured image by using a computer, the computer performs processing of detecting both ends of a length measurement target portion of the object from the captured image, and then performs processing of calculating the length between the detected both ends, for example.

In the processing of detecting the both ends of the length measurement target portion as described above from the captured image, the computer refers to reference data of a dictionary held in a storage device, for example. As a method of generating the reference data, for example, there is machine learning using a plurality of teacher data different from each other in which the both ends of the length measurement target portion of the object to be observed are imaged.

PTL 1 discloses a technique related to generation of a clipping area detection model used in processing of clipping an image area necessary for personal authentication and motion recognition from a captured image.

CITATION LIST

Patent Literature

[PTL 1] JP 2005-250863 A

SUMMARY OF INVENTION

Technical Problem

In processing in which a computer detects, for example, both ends of a length measurement target portion (such a portion to be detected is hereinafter also referred to as a detection target) of an object from a captured image by using reference data of a dictionary, there have been cases where problems as described below occur. For example, one of the problems is that although an object to be observed is imaged in the captured image, the detection target cannot be detected. Another problem is that even when the computer detects the detection target from the captured image, a position of the detection target deviates from a correct position (for example, the both ends of the length measurement target portion).

The present invention has been devised to solve the above problems. That is, a main object of the present invention is to provide a technique for increasing a detection rate of detecting a detection target from a captured image and certainty of a detection position of the detection target.

Solution to Problem

To achieve the above object, a dictionary learning device according to the present invention includes:

a reference data extraction unit that extracts an image of a reference image area from a captured image based on reference extraction information, the reference image area including a detection target in an object to be recognized and serving as a reference, the captured image being captured by an imaging device that images the object to be recognized;

an enlarged data extraction unit that extracts an image of an enlarged image area from the captured image based on enlargement extraction information, the enlarged image area including the reference image area and being larger than the reference image area, and including a background in which an object other than the object to be recognized is shown;

a reduced data extraction unit that extracts an image of a reduced image area from the captured image based on reduction extraction information, the reduced image area including the detection target and being smaller than the reference image area, and being an area in which the object to be recognized is partially outside the image area; and a learning unit that learns a dictionary including reference data to be referred to in detection processing of detecting the detection target from the captured image by using the images of the reference image area, the enlarged image area, and the reduced image area.

An information processing device according to the present invention includes:

a storage device that holds a dictionary learned by the dictionary learning device according to the present invention;

a detection unit that detects a detection target in an object to be recognized, from a captured image by an imaging device, by using the dictionary of the storage device; and a processing unit that executes processing using the detection target detected.

A dictionary learning method according to the present invention, with a computer, extracting an image of a reference image area from a captured image based on reference extraction information, the reference image area including a detection target in an object to be recognized and serving as a reference, the captured image being captured by an imaging device that images the object to be recognized;

extracting an image of an enlarged image area from the captured image based on enlargement extraction information, the enlarged image area including the reference image area and being larger than the reference image area, and including a background in which an object other than the object to be recognized is shown;

extracting an image of a reduced image area from the captured image based on reduction extraction information, the reduced image area including the detection target and being smaller than the reference image area, and being an area in which the object to be recognized is partially outside the image area; and learning a dictionary including reference data to be referred to in detection processing of detecting the detection target from the captured image by using the images of the reference image area, the enlarged image area, and the reduced image area.

The program storage medium according to the present invention stores a computer program causing a computer to execute:

extracting an image of a reference image area from a captured image based on reference extraction information, the reference image area including a detection target in an object to be recognized and serving as a reference, the captured image being captured by an imaging device that images the object to be recognized;

extracting an image of an enlarged image area from the captured image based on enlargement extraction information, the enlarged image area including the reference image area and being larger than the reference image area, and including a background in which an object other than the object to be recognized is shown;

extracting an image of a reduced image area from the captured image based on reduction extraction information, the reduced image area including the detection target and being smaller than the reference image area, and being an area in which the object to be recognized is partially outside the image area; and learning a dictionary including reference data to be referred to in detection processing of detecting the detection target from the captured image by using the images of the reference image area, the enlarged image area, and the reduced image area.

Advantageous Effects of Invention

According to the present invention, it is possible to increase the detection rate of detecting the detection target from the captured image and the certainty of the detection position of the detection target.

EXAMPLE EMBODIMENT

Example embodiments according to the present invention will be described below with reference to the drawings.

First Example Embodiment

Figure 1:
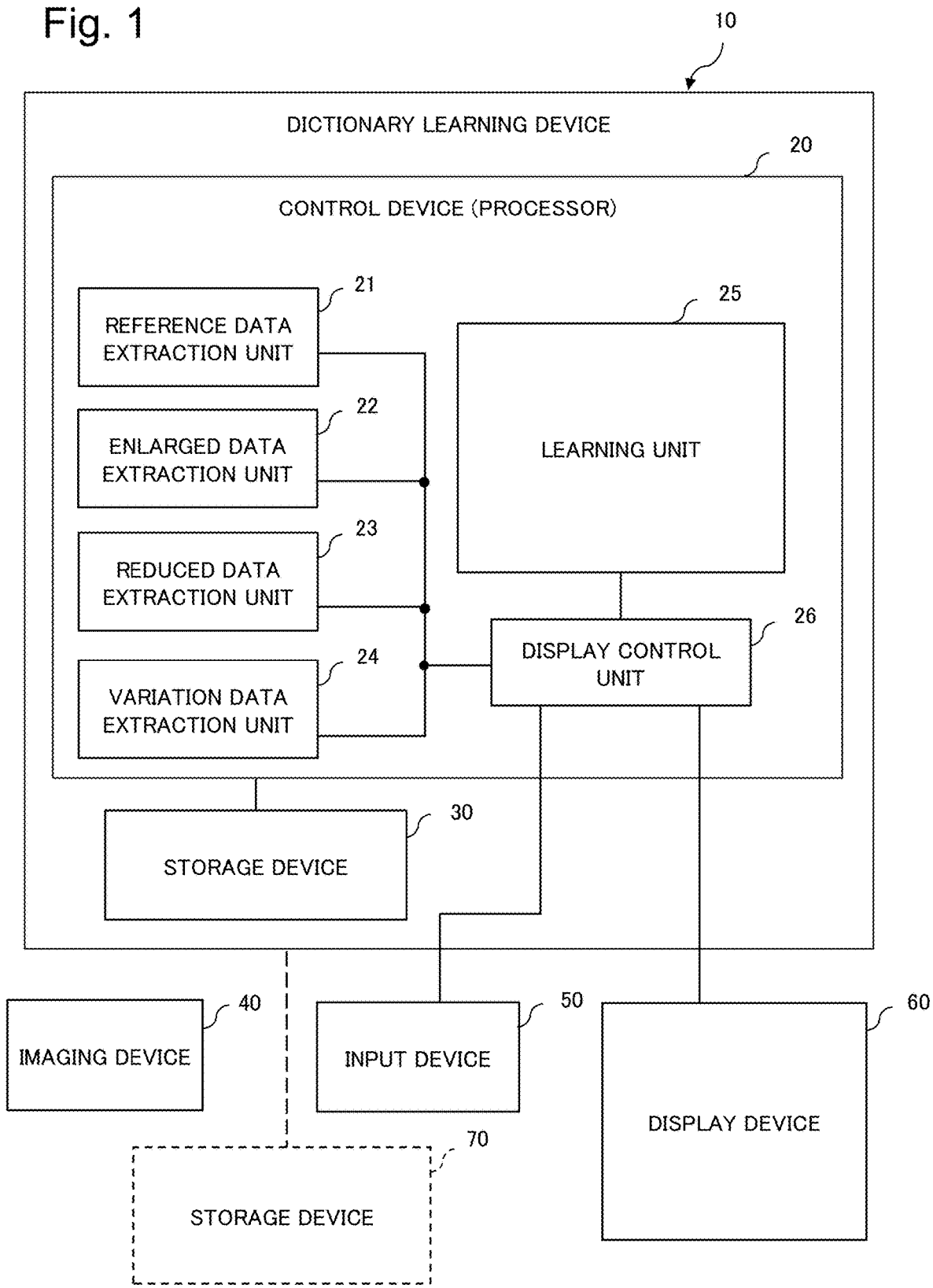
FIG. 1 is a block diagram illustrating a simplified configuration of a dictionary learning device of a first example embodiment according to the present invention.
Figure 2:
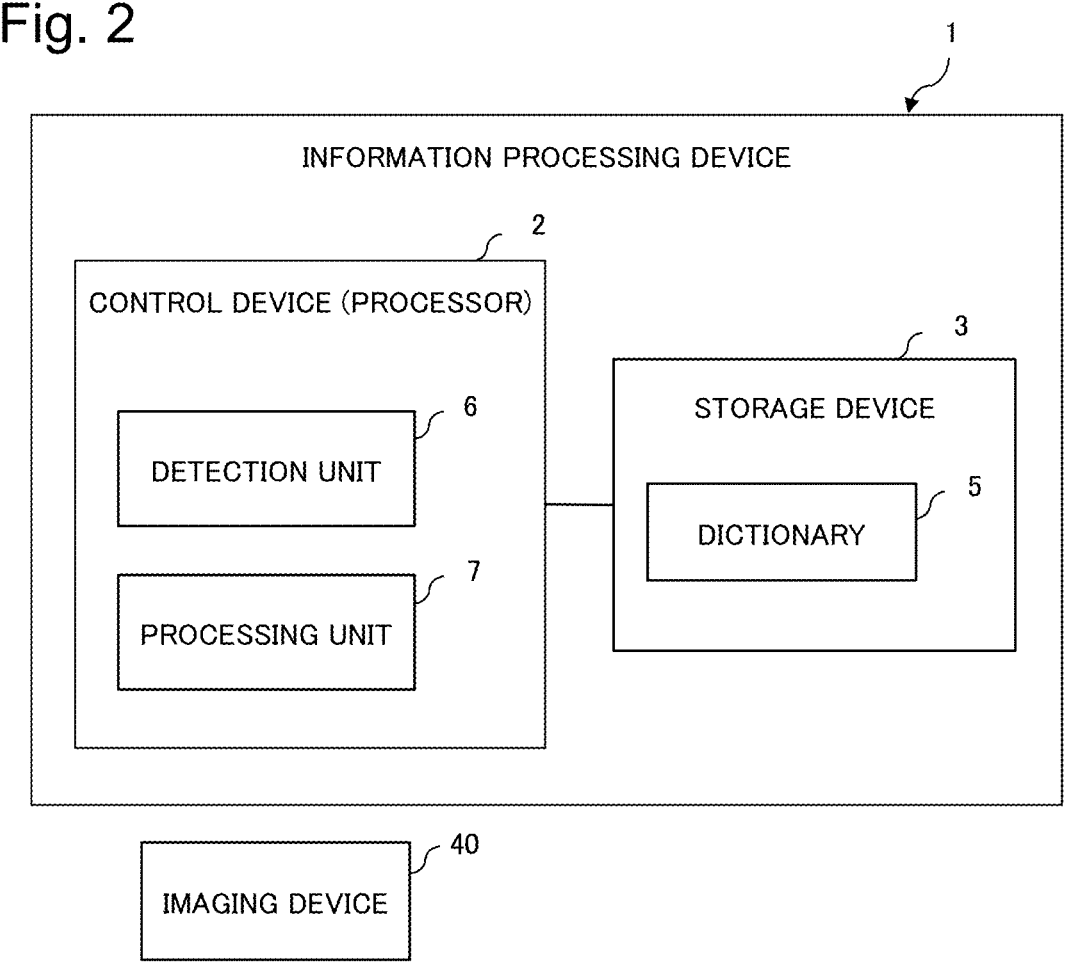
FIG. 2 is a block diagram illustrating a simplified configuration of an information processing device using a dictionary learned by the dictionary learning device of the first example embodiment.

FIG. 1 is a block diagram illustrating a simplified configuration of a dictionary learning device of a first example embodiment according to the present invention. A dictionary learning device 10 of the first example embodiment is a device for learning a dictionary used by a computer. The dictionary here includes reference data held in a storage device 3 included in an information processing device (computer) 1 as illustrated in FIG. 2 and referred to when a control device (processor) 2 of the information processing device 1 executes processing.

Figure 3:
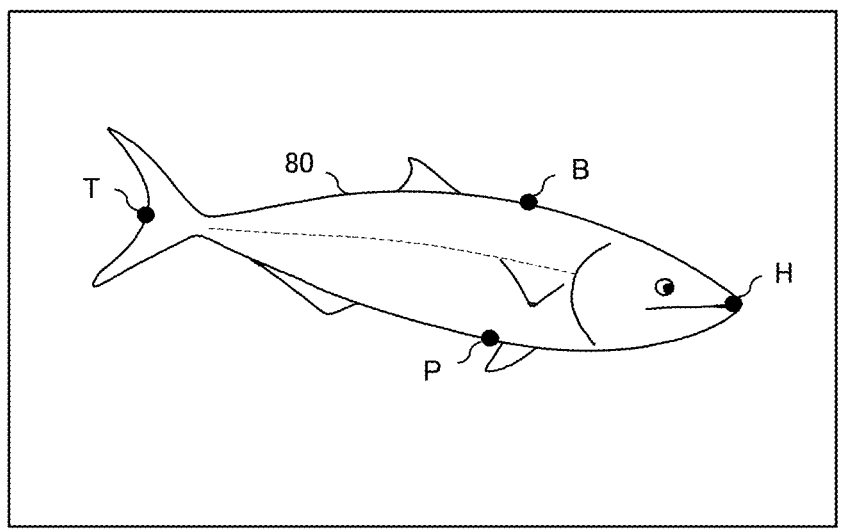
FIG. 3 is a model diagram illustrating a specific example of an object to be recognized and a detection target of the object.

In the first example embodiment, the control device 2 of the information processing device 1 using the dictionary learned by the dictionary learning device 10 includes, as functional units, a detection unit 6 and a processing unit 7. The detection unit 6 has a function of detecting a predetermined detection target in an object to be recognized from a captured image by an imaging device 40 with reference to a dictionary 5. As a specific example, the detection unit 6 detects, as detection targets, a snout H, and a forked portion T of the tail, of a fish 80, from the captured image of the fish 80 that is the object to be recognized as illustrated in FIG. 3, with reference to the dictionary 5. Furthermore, the detection unit 6 detects a dorsal top portion B and a ventral bulge portion P of the fish 80, from the captured image of the object to be recognized (fish) 80, with reference to the dictionary 5. The detection unit 6 may detect the base of a ventral fin instead of the ventral bulge portion P.

The processing unit 7 has a function of executing processing using a detection target detected by the detection unit 6. As a specific example, the processing unit 7 calculates position information of the snout H and the forked portion T of the tail detected by the detection unit 6, and calculates a fork length of the fish 80 on the basis of the calculated position information of the snout H and the forked portion T of the tail. When the detection unit 6 detects the dorsal top portion B and the ventral bulge portion (or the base of the ventral fin) P of the fish 80, the processing unit 7 may calculate position information of the dorsal top portion B and the ventral bulge portion (the base of the ventral fin) P and calculate a body depth of the fish 80 on the basis of the calculated position information. Furthermore, the processing unit 7 may estimate a body weight of the fish 80 by using the calculated fork length and body depth.

When the detection unit 6 and the processing unit 7 execute the processing of the specific examples described above, an imaging device as described below is used as the imaging device 40. That is, the imaging device 40 has a configuration capable of generating a stereograph by implementing binocular parallax by imaging a target object simultaneously from a plurality of different directions, for example. As an imaging device having such a configuration, there is a camera called a stereo camera (a camera on which a plurality of lenses is mounted in a state of being arranged side by side and that can acquire a plurality of captured images simultaneously imaged through the lenses), but a device having a configuration in which two cameras are fixed to a support member in a state in which the cameras are arranged side by side with an interval (for example, baseline length: 1 meter) may be used as the imaging device 40. A captured image by such an imaging device 40 is an image from which it is possible to acquire not only length information of the captured image in the vertical direction and the horizontal direction but also length information of the captured image in the depth direction. The imaging device 40 may have a function of imaging a moving image, may have a function of capturing a still image without having a moving image capturing function, or may have a function of capturing a moving image and a still image.

For example, the imaging device 40 enters a fish tank in which fish is cultured, is arranged at a water depth and in a lens orientation determined to be appropriate for observation of the fish (in other words, imaging of fish to be observed), and images the fish. As a method of providing the captured image of the fish imaged by the imaging device 40 to the dictionary learning device 10 or the information processing device 1, for example, there is a method using wired communication or wireless communication. Alternatively, there is a method in which the captured image of the fish is stored in a portable storage medium (for example, a Secure Digital (SD) card) from the imaging device 40, and then the image is provided from the portable storage medium to the dictionary learning device 10 or the information processing device 1.

The dictionary learning device 10 of the first example embodiment has a function of learning the dictionary 5 to be provided to the information processing device 1 by a supervised learning method by using teacher data using the captured image by the imaging device 40.

That is, the dictionary learning device 10 includes a computer. The computer may be a device dedicated to dictionary learning, or may be a device for executing not only a dictionary learning function but also processing using the dictionary (for example, processing of calculating the fork length and body weight of the fish). That is, the information processing device 1 as illustrated in FIG. 2 may also have a function as the dictionary learning device 10.

As illustrated in FIG. 1, the dictionary learning device 10 is connected to an input device 50 and a display device 60. The input device 50 is a device (for example, a keyboard, mouse, or touch panel) for inputting information into the dictionary learning device 10 by an operation of a user (operator) operating the dictionary learning device 10. The display device 60 is a device (display) for displaying information. The dictionary learning device 10 may be further connected to an external storage device 70 separate from the dictionary learning device 10.

The dictionary learning device 10 generally includes a control device 20 and a storage device 30. The storage device 30 has a function of storing various data and computer programs, and is implemented by a storage medium such as a hard disk device or a semiconductor memory, for example. The storage device included in the dictionary learning device 10 is not limited to one storage device, and a plurality of types of storage devices may be included in the dictionary learning device 10, and in this case, the plurality of types of the storage devices will be collectively referred to as the storage device 30. Similarly to the storage device 30, the storage device 70 has a function of storing various data and computer programs, and is implemented by a storage medium such as a hard disk device or a semiconductor memory, for example. When the dictionary learning device 10 is connected to the storage device 70, appropriate information is stored in the storage device 70. In this case, the dictionary learning device 10 executes processing of writing and reading information to and from the storage device 70 as appropriate, but a description of processing regarding the storage device 70 is omitted in the following description.

In the first example embodiment, the captured image by the imaging device 40 is stored in the storage device 30 in a state where the captured image is associated with identification information for identifying the imaging device 40 that has captured the image, and information related to an imaging situation such as information on the imaging time.

The control device 20 includes, for example, a processor such as a Central Processing Unit (CPU) or a Graphics Processing Unit (GPU). The control device 20 can have a function as described below, for example, by the processor executing a computer program stored in the storage device 30. That is, the control device 20 includes, as functional units, a reference data extraction unit 21, an enlarged data extraction unit 22, a reduced data extraction unit 23, a variation data extraction unit 24, a learning unit 25, and a display control unit 26.

The display control unit 26 has a function of controlling display operation of the display device 60. For example, the display control unit 26 displays, on the display device 60, information input to the dictionary learning device 10 by an operation of the input device 50 by the user. The display control unit 26 displays, on the display device 60, information requested to be displayed from the reference data extraction unit 21 or the like.

The reference data extraction unit 21 has a function of extracting a reference image area including the detection target of the object to be recognized from the captured image by the imaging device 40 to generate teacher data. The reference image area is an image area serving as a reference when an image area used for generating the teacher data is extracted from the captured image, and is an area satisfying a reference extraction condition determined by the user in consideration of, for example, processing using the detection target.

Figure 4:
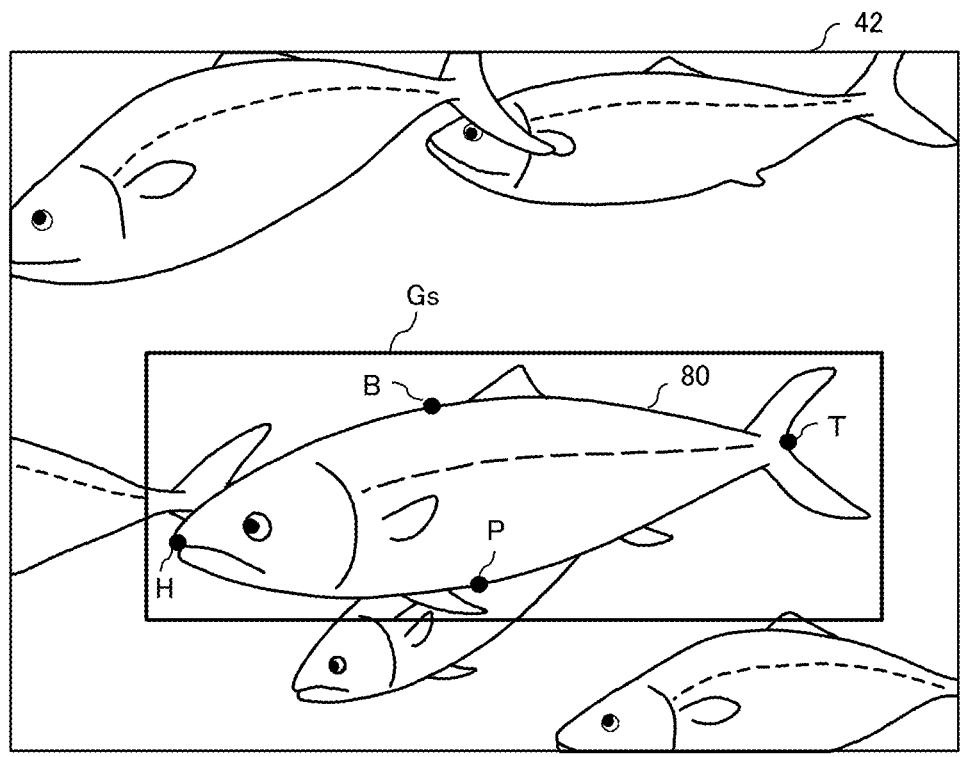
FIG. 4 is a diagram explaining an example of a reference image area in a captured image.

For example, it is assumed that the reference data extraction unit 21 extracts a reference image area used for generating the teacher data used in the learning of a dictionary used in processing of detecting the snout H, forked portion T of the tail, ventral bulge portion P, and dorsal top portion B of the fish as detection targets. An example of the reference image area in this case is a reference image area Gs in a captured image 42 as illustrated in FIG. 4. The reference image area Gs is an area satisfying a reference extraction condition as described below determined by the user in consideration of calculation processing of the measurement values of the lengths such as the fork length and the body depth using the detection targets H, T, P, and B in the fish 80 that is the object to be recognized. The reference extraction condition is a condition that satisfies all of the following conditions: the area is rectangular; all of the detection targets H, T, P, and B are included; the posture of the fish 80 is a basic posture appropriate for length calculation (that is, the posture that is straight from head to tail, or can be regarded as straight); and entering of a background other than the fish 80 is suppressed.

For example, in a state where the captured image by the imaging device 40 is displayed on the display device 60, the reference data extraction unit 21 requests the display control unit 26 to display a message or the like prompting the user to perform an operation of specifying the reference image area and the detection target. It is assumed that the user specifies the reference image area in the captured image by an operation of the input device 50 in response to the display of the display device 60 by the display control unit 26 responding to the request. In this case, the reference data extraction unit 21 acquires information related to the position and size of the specified reference image area from the display control unit 26 as reference extraction information. The acquired reference extraction information is stored in the storage device 30 by, for example, the reference data extraction unit 21.

Figure 5A:
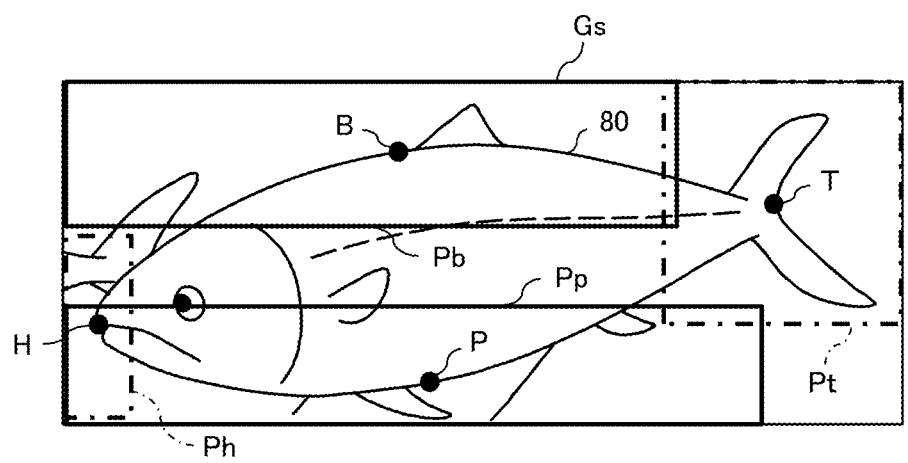
FIG. 5A is a diagram explaining position information of the detection target in the reference image area together with FIG. 5B.
Figure 5B:
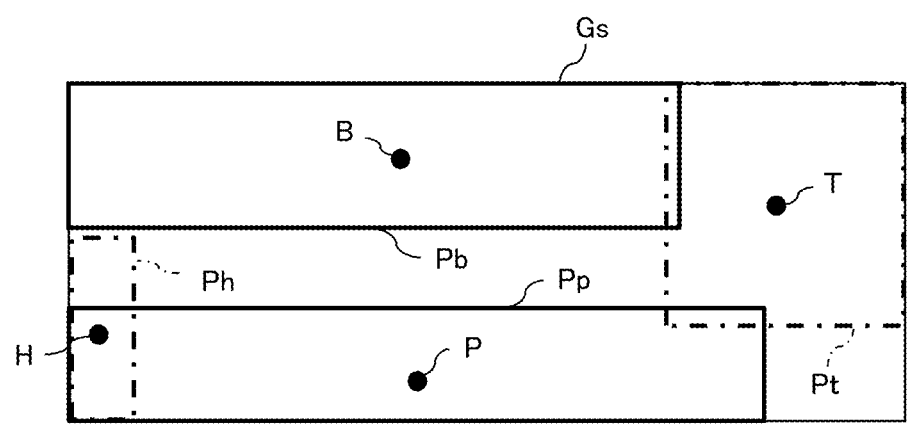
FIG. 5B is a diagram explaining the position information of the detection target in the reference image area together with FIG. 5A.

Furthermore, the reference data extraction unit 21 extracts an image of the reference image area from the captured image on the basis of the reference extraction information acquired from the display control unit 26. Moreover, the reference data extraction unit 21 associates the extracted image of the reference image area with position information representing the position of the detection target specified by the user, thereby generating teacher data including the image of the reference image area and the position information of the detection target in the reference image area. Here, the position information of the detection target is represented by using partial areas Ph, Pt, Pp, and Pb as illustrated in FIGS. 5A and 5B. FIG. 5B is a diagram in which the image of the fish 80 is removed from FIG. 5A to make the partial areas Ph, Pt, Pp, and Pb easier to understand.

The partial areas Ph, Pt, Pp, and Pb are rectangular, and each are an area in which a vertex set as a reference point from among vertexes of four corners coincides with a corresponding vertex of the reference image area Gs, and the detection targets H, T, P, and B are positioned at the center positions of the respective partial areas. That is, the partial area Ph is an area in which the lower left vertex in FIGS. 5A and 5B is set as a reference point, the reference point coincides with the lower left vertex of the reference image area Gs, and the snout H of the fish 80 that is a detection target is positioned at the center position of the partial area Ph. The partial area Pt is an area in which the upper right vertex in FIGS. 5A and 5B is set as a reference point, the reference point coincides with the upper right vertex of the reference image area Gs, and the forked portion T of the tail of the fish 80 that is a detection target is positioned at the center position of the partial area Pt. The partial area Pp is an area in which the lower left vertex in FIGS. 5A and 5B is set as a reference point, the reference point coincides with the lower left vertex of the reference image area Gs, and the ventral bulge portion P of the fish 80 that is a detection target is positioned at the center position of the partial area Pp. The partial area Pb is an area in which the upper left vertex in FIGS. 5A and 5B is set as a reference point, the reference point coincides with the upper left vertex of the reference image area Gs, and the dorsal top portion B of the fish 80 that is a detection target is positioned at the center position of the partial area Pb.

That is, the partial areas Ph, Pt, Pp, and Pb represent the positions of the detection targets H, T, P, and B by the center positions of the partial areas Ph, Pt, Pp, and Pb, respectively.

The reference data extraction unit 21 stores the teacher data generated by using the reference image area extracted from the captured image as described above in the storage device 30.

Figure 6:
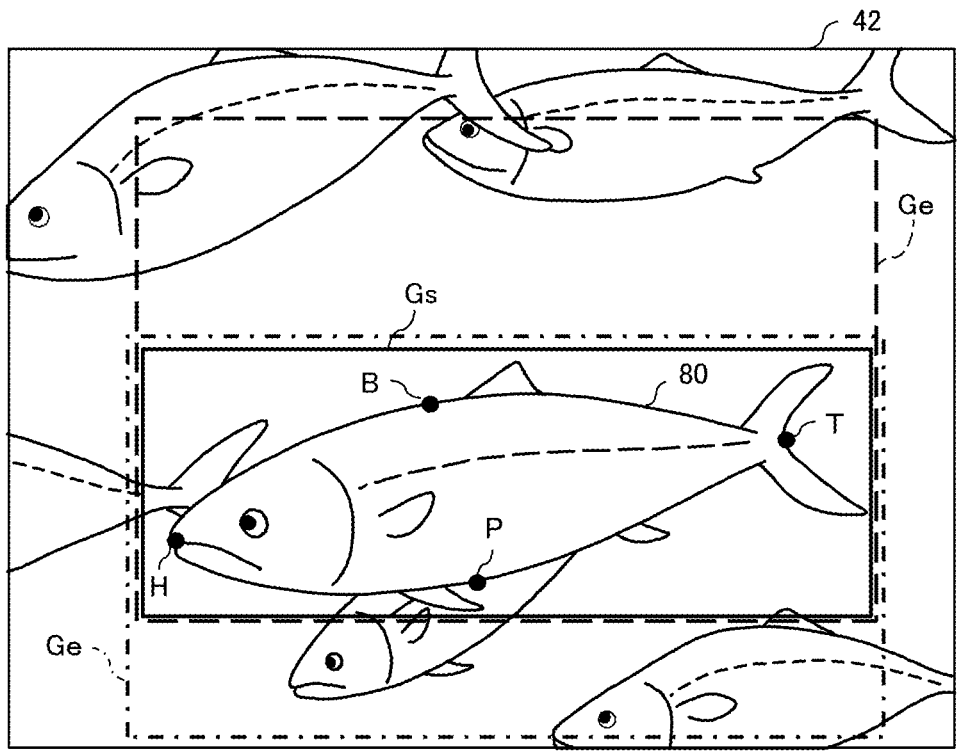
FIG. 6 is a model diagram illustrating a specific example of an enlarged image area.
Figure 7:
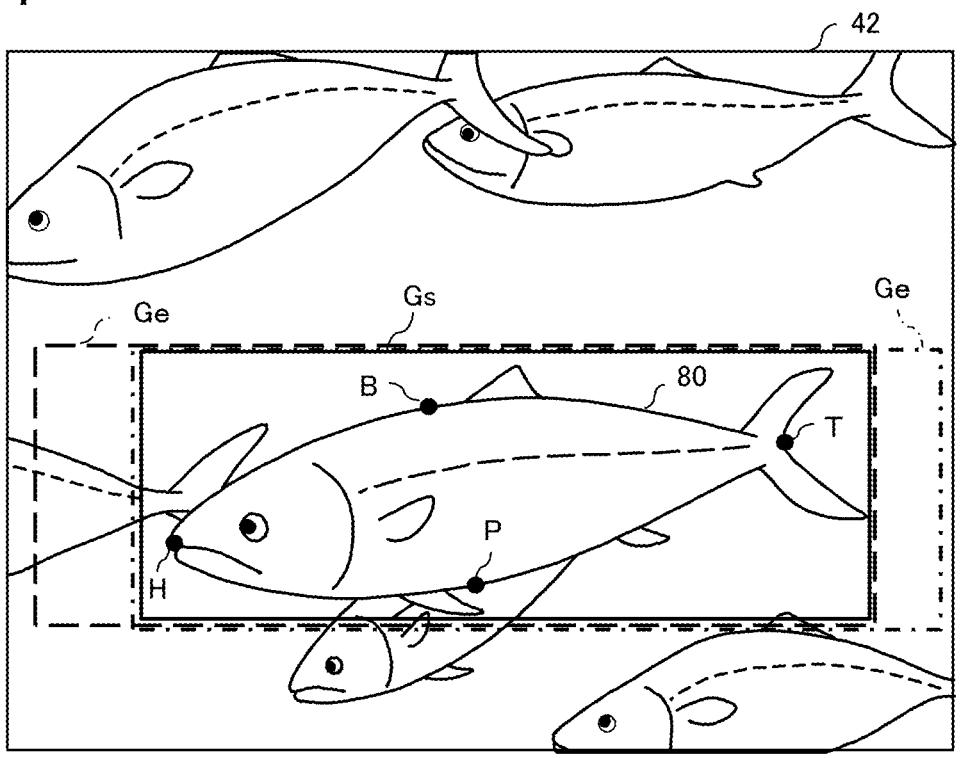
FIG. 7 is a model diagram illustrating another specific example of the enlarged image area.
Figure 8:
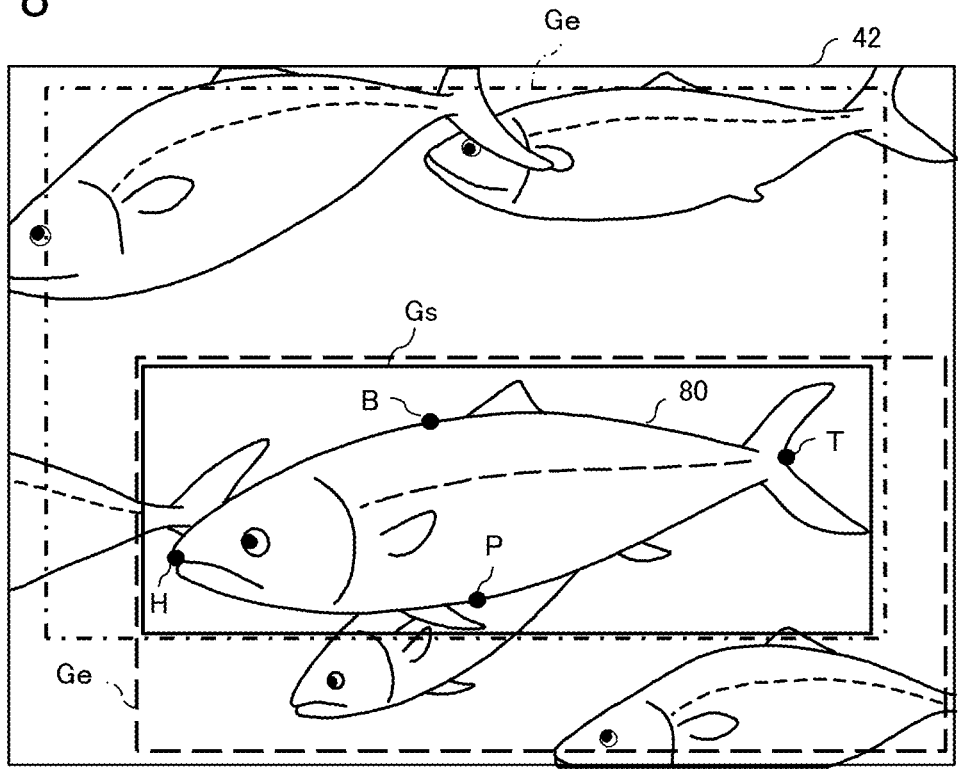
FIG. 8 is, furthermore, a model diagram illustrating another specific example of the enlarged image area.
Figure 9:
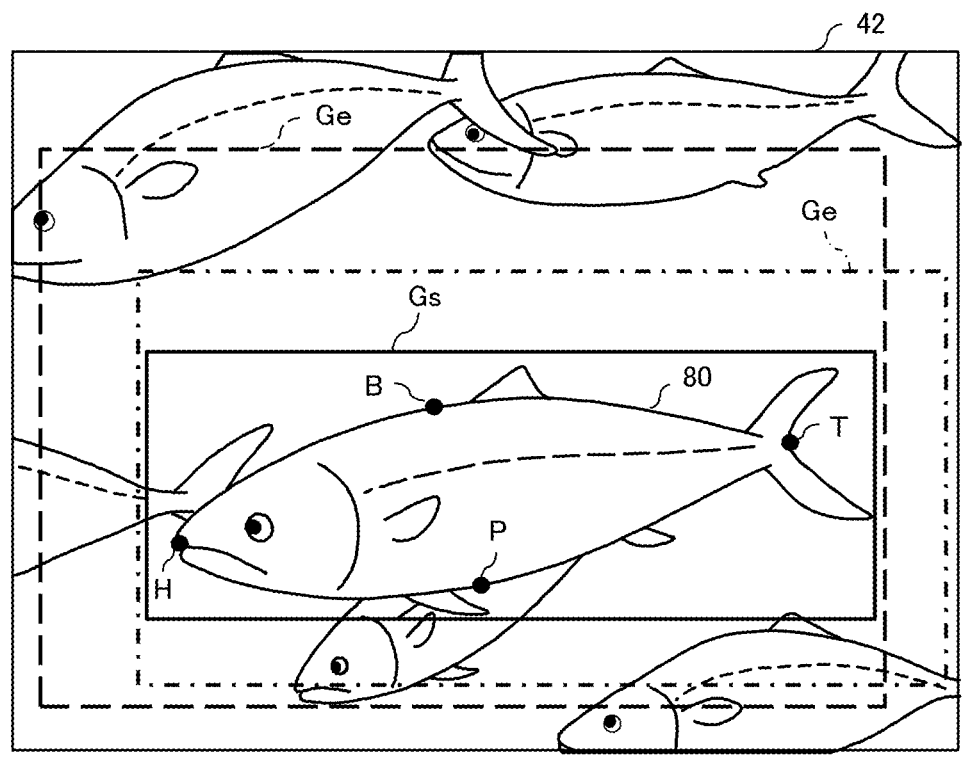
FIG. 9 is, moreover, a model diagram illustrating another specific example of the enlarged image area.

The enlarged data extraction unit 22 has a function of extracting an enlarged image area from the captured image by the imaging device 40. The enlarged image area is an image area that includes the reference image area and is larger than the reference image area, and that includes a background in which an object other than the object to be recognized is shown. FIGS. 6 to 9 each illustrate a specific example of the enlarged image area. An enlarged image area Ge in FIG. 6 is an image area in which the reference image area Gs is enlarged in the upward direction as indicated by the dotted line in FIG. 6 or in the downward direction as indicated by the chain line in FIG. 6. The enlarged image area Ge in FIG. 7 is an image area in which the reference image area Gs is enlarged in the left direction as indicated by the dotted line in FIG. 7 or in the right direction as indicated by the chain line in FIG. 7. The enlarged image area Ge in FIG. 8 is an image area in which the reference image area Gs is enlarged in two directions out of the upward direction, the downward direction, the left direction, and the right direction in FIG. 8. That is, the enlarged image area Ge includes an image area in which the reference image area Gs is enlarged in two directions of the downward direction and the right direction as indicated by the dotted line in FIG. 8, in two directions of the upward direction and the left direction as indicated by the chain line in FIG. 8, in two directions of the upward direction and the downward direction, in two directions of the right direction and the left direction, in two directions of the upward direction and the right direction, or in two directions of the downward direction and the left direction. The enlarged image area Ge in FIG. 9 is an image area in which the reference image area Gs is enlarged in at least three directions out of the upward direction, the downward direction, the left direction, and the right direction in FIG. 9. That is, the enlarged image area Ge includes an image area in which the reference image area Gs is enlarged in three directions of the upward direction, the left direction, and the downward direction as indicated by the dotted line in FIG. 9, in three directions of the upward direction, the right direction, and the downward direction as indicated by the chain line in FIG. 9, in three directions of the upward direction, the right direction, and the left direction, or in three directions of the downward direction, the right direction, and the left direction. Furthermore, the enlarged image area Ge includes an image area in which the reference image area Gs is enlarged in four directions of the upward direction, the downward direction, the left direction, and the right direction.

In the first example embodiment, after the reference image area Gs is extracted by the reference data extraction unit 21, the enlarged data extraction unit 22 extracts the enlarged image area Ge from the captured image from which the reference image area Gs is extracted, on the basis of enlargement extraction information stored in the storage device 30. The enlargement extraction information is information including the number of enlarged image areas Ge to be extracted on the basis of the reference image area Gs, and information on an enlargement direction of the enlarged image area Ge and its enlargement ratio, with respect to the reference image area Gs. When a plurality of the enlarged image areas Ge is extracted on the basis of the reference image area Gs, the enlargement extraction information includes information on a plurality of enlargement types different from each other in one or both of the enlargement direction and the enlargement ratio of the enlarged image area Ge to be extracted. As a specific example, it is assumed that the enlargement extraction information includes information in which the number of enlarged image areas Ge to be extracted on the basis of the reference image area Gs is "3". In this case, the enlargement extraction information includes information on three enlargement types I, II, and III. For example, the enlargement type I is information such that the enlargement direction with respect to the reference image area Gs is "the upward direction and the left direction" and the enlargement ratio is "110%". The enlargement type II is information such that the enlargement direction with respect to the reference image area Gs is "the upward direction" and the enlargement ratio is "125%". The enlargement type III is information such that the enlargement direction with respect to the reference image area Gs is "the left direction and the right direction" and the enlargement ratio is "110%".

On the basis of such enlargement extraction information, the enlarged data extraction unit 22 extracts the enlarged image area Ge from the captured image.

Instead of the enlargement extraction information stored in advance in the storage device 30, the enlarged data extraction unit 22 may acquire the enlargement extraction information as follows, and the enlarged data extraction unit 22 may extract the enlarged image area Ge from the captured image on the basis of the acquired enlargement extraction information. That is, in a state where the captured image by the imaging device 40 is displayed on the display device 60 together with information representing the extracted reference image area Gs, the enlarged data extraction unit 22 requests the display control unit 26 to display a message or the like prompting the user to perform an operation of specifying the enlarged image area Ge. It is assumed that the user specifies the enlarged image area Ge in the captured image by an operation of the input device 50 in response to the display of the display device 60 by the display control unit 26 responding to the request. In this case, the enlarged data extraction unit 22 acquires information related to the position and size of the specified enlarged image area Ge from the display control unit 26 as the enlargement extraction information. Furthermore, the enlarged data extraction unit 22 extracts an image of the enlarged image area Ge from the captured image on the basis of the enlargement extraction information acquired from the display control unit 26.

The enlarged data extraction unit 22 further associates the extracted image of the enlarged image area Ge with position information representing the position of the detection target, thereby generating teacher data including the image of the enlarged image area Ge and the position information of the detection target in the enlarged image area Ge.

The position information of the detection target to be associated with the image of the enlarged image area Ge is information using the partial areas Ph, Pt, Pp, and Pb similarly to the position information of the detection target to be associated with the image of the reference image area Gs. However, in the partial areas Ph, Pt, Pp, and Pb used for the position information of the detection target to be associated with the image of the enlarged image area Ge, the vertex as the reference point may coincide with the corresponding vertex of the enlarged image area Ge, or may coincide with the corresponding vertex of the reference image area Gs. That is, when the vertexes of the partial areas Ph, Pt, Pp, and Pb as the reference points coincide with the corresponding vertexes of the reference image area Gs, the positions and sizes of the partial areas Ph, Pt, Pp, and Pb are similar to those of the partial areas Ph, Pt, Pp, and Pb in the reference image area Gs. When the vertexes of the partial areas Ph, Pt, Pp, and Pb as the reference points coincide with the corresponding vertexes of the enlarged image area Ge, the partial areas Ph, Pt, Pp, and Pb become areas that are enlarged from the partial areas Ph, Pt, Pp, and Pb in the reference image area Gs, depending on the direction in which the enlarged image area Ge is enlarged from the reference image area Gs.

The enlarged data extraction unit 22 generates teacher data by using the enlarged image area extracted from the captured image as described above, and stores the generated teacher data in the storage device 30.

Figure 10:
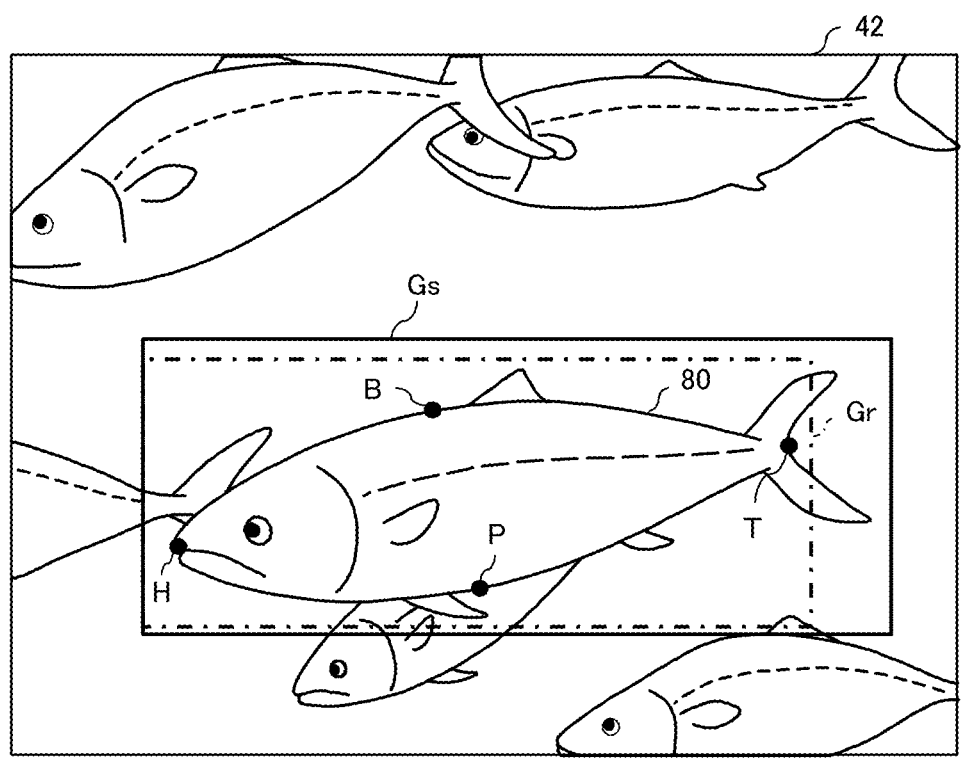
FIG. 10 is a model diagram illustrating a specific example of a reduced image area.

The reduced data extraction unit 23 has a function of extracting a reduced image area from the captured image by the imaging device 40. The reduced image area is an image area that includes the detection target and is smaller than the reference image area, and in which the object to be recognized is partially outside the area. FIG. 10 illustrates a specific example of the reduced image area. A reduced image area Gr in FIG. 10 is an area that includes the detection targets H, T, P, and B and is reduced from the reference image area Gs, and is an image area in which a part of the tail of the fish 80 that is the object to be recognized is outside the area. As a modification of the reduced image area Gr in FIG. 10, the modification may be an image area in which not only a part of the tail of the fish 80 that is the object to be recognized but also the ventral fin is outside the area. As another modification of the reduced image area Gr in FIG. 10, the another modification may be an image area in which the entire tail of the fish 80 that is the object to be recognized is included in the reduced image area Gr but one or both of the ventral fin and the dorsal fin of the fish 80 are outside the area. That is, the reduced image area Gr includes an image area reduced from the reference image area Gs in one direction out of the upward direction, the downward direction, the left direction, and the right direction, or in two directions out of the upward direction, the downward direction, the left direction, and the right direction. The reduced image area Gr also includes an image area reduced from the reference image area Gs in three directions out of the upward direction, the downward direction, the left direction, and the right direction, or in four directions of the upward direction, the downward direction, the left direction, and the right direction.

After the reference image area Gs is extracted by the reference data extraction unit 21, the reduced data extraction unit 23 extracts the reduced image area Gr from the captured image from which the reference image area Gs is extracted, on the basis of reduction extraction information stored in the storage device 30. The reduction extraction information is information including the number of reduced image areas Gr to be extracted on the basis of the reference image area Gs, and information on a reduction direction of the reduced image area Gr and its reduction ratio, with respect to the reference image area Gs. When a plurality of the reduced image areas Gr is extracted on the basis of the reference image area Gs, the reduction extraction information includes information on a plurality of reduction types different from each other in one or both of the reduction direction and the reduction ratio of the extracted reduced image area Gr. As a specific example, it is assumed that the reduction extraction information includes information in which the number of reduced image areas Gr to be extracted on the basis of the reference image area Gs is "2". In this case, the reduction extraction information includes information on two reduction types I and II. For example, the reduction type I is information such that the reduction direction with respect to the reference image area Gs is "the left direction" and the reduction ratio is "95%". The reduction type II is information such that the reduction direction with respect to the reference image area Gs is "the upward direction and the left direction" and the reduction ratio is "upward: 95%, left: 92%".

On the basis of such reduction extraction information, the reduced data extraction unit 23 extracts the reduced image area Gr from the captured image.

Instead of the reduction extraction information stored in advance in the storage device 30, the reduced data extraction unit 23 may acquire the reduction extraction information as follows, and the reduced data extraction unit 23 may extract the reduced image area Gr from the captured image on the basis of the acquired reduction extraction information. That is, in a state where the captured image by the imaging device 40 is displayed on the display device 60 together with information representing the extracted reference image area Gs, the reduced data extraction unit 23 requests the display control unit 26 to display a message or the like prompting the user to perform an operation of specifying the reduced image area Gr. It is assumed that the user specifies the reduced image area Gr in the captured image by an operation of the input device 50 in response to the display of the display device 60 by the display control unit 26 responding to the request. In this case, the reduced data extraction unit 23 acquires information related to the position and size of the specified reduced image area Gr from the display control unit 26 as the reduction extraction information. Furthermore, the reduced data extraction unit 23 extracts an image of the reduced image area Gr from the captured image on the basis of the reduction extraction information acquired from the display control unit 26.

The reduced data extraction unit 23 further associates the extracted image of the reduced image area Gr with position information representing the position of the detection target, thereby generating teacher data including the image of the reduced image area Gr and the position information of the detection target in the reduced image area Gr.

The position information of the detection target to be associated with the image of the reduced image area Gr is information using the partial areas Ph, Pt, Pp, and Pb similarly to the position information of the detection target to be associated with the image of the reference image area Gs. The partial areas Ph, Pt, Pp, and Pb in the reduced image area Gr are rectangular, and each are an area in which a vertex set as a reference point from among vertexes of four corners coincides with a corresponding vertex of the reduced image area Gr, and the detection targets H, T, P, and B are positioned at the center positions of the respective partial areas. That is, the partial areas Ph, Pt, Pp, and Pb in the reduced image area Gr become areas that are reduced from the partial areas Ph, Pt, Pp, and Pb in the reference image area Gs, depending on the direction in which the reduced image area Gr is reduced from the reference image area Gs.

The reduced data extraction unit 23 generates teacher data by using the reduced image area extracted from the captured image as described above, and stores the generated teacher data in the storage device 30.

Figure 11:
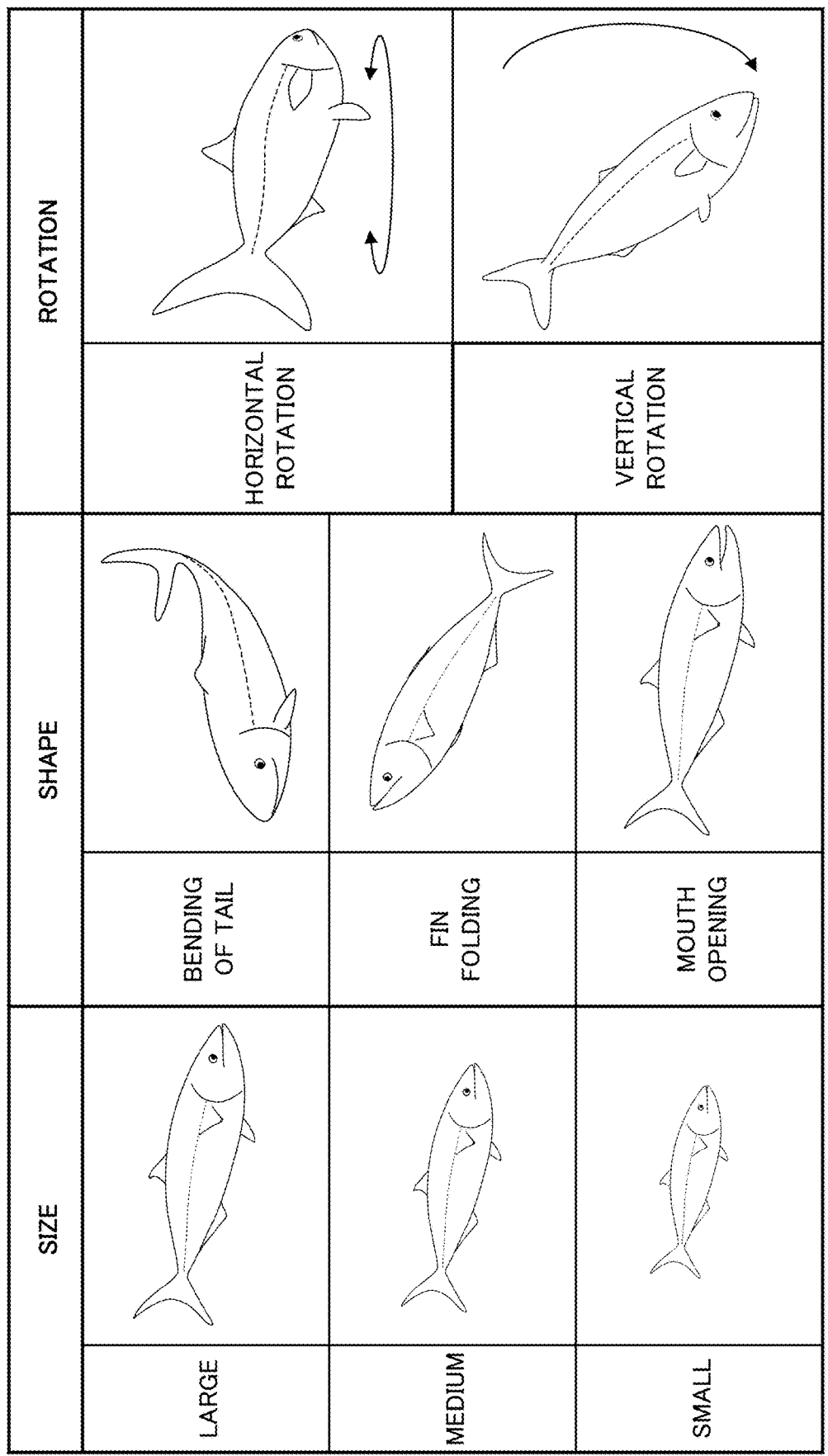
FIG. 11 is a model diagram illustrating specific examples of a variation image area.
Figure 12:
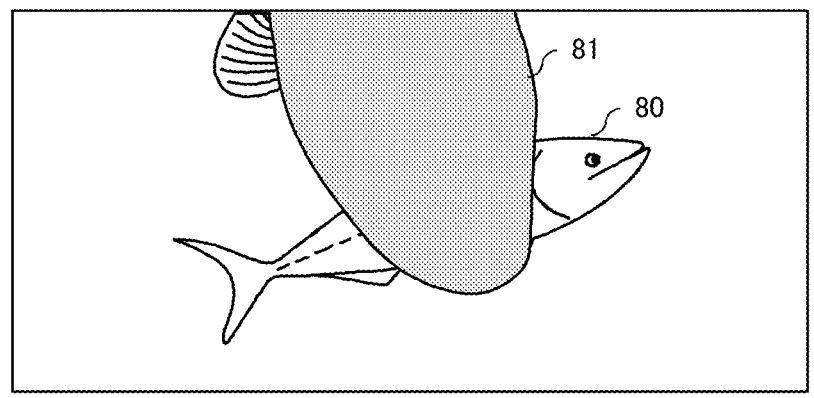
FIG. 12 is a model diagram illustrating another specific example of the variation image area.

The variation data extraction unit 24 has a function of extracting an image area including the object to be recognized in a variation state from the captured image on the basis of variation extraction information. The variation state is a state of being varied from a basic posture of the object to be recognized that is set in consideration of the processing of the processing unit 7 of the information processing device 1 using the detection target detected from the object to be recognized. FIG. 11 illustrates specific examples of an object to be recognized (fish) in a variation state. A state in which a part of the object to be recognized (fish 80) is hidden by another object 81 as illustrated in FIG. 12 is also a variation state.

For example, in a state where the captured image by the imaging device 40 is displayed on the display device 60, the variation data extraction unit 24 requests the display control unit 26 to display a message or the like prompting the user to perform an operation of specifying the detection target and a variation image area including the object to be recognized in a variation state. It is assumed that the user specifies the variation image area and the detection target in the captured image by an operation of the input device 50 in response to the display of the display device 60 by the display control unit 26 responding to the request. In this case, the variation data extraction unit 24 acquires information related to the position and size of the specified variation image area from the display control unit 26 as the variation extraction information. Furthermore, the variation data extraction unit 24 extracts an image of the variation image area from the captured image on the basis of the variation extraction information acquired from the display control unit 26.

Moreover, the variation data extraction unit 24 associates the extracted image of the variation image area with position information representing the position of the detection target specified by the user, thereby generating teacher data including the image of the variation image area and the position information of the detection target in the variation image area. The position information of the detection target is represented by using the partial areas Ph, Pt, Pp, and Pb as described above, for example. That is, the partial areas Ph, Pt, Pp, and Pb are rectangular, and each are an area in which a vertex set as a reference point from among vertexes of four corners coincides with a corresponding vertex of the variation image area, and the detection targets H, T, P, and B are positioned at the center positions of the respective partial areas.

The variation data extraction unit 24 generates teacher data by using the variation image area extracted from the captured image as described above, and stores the generated teacher data in the storage device 30.

The learning unit 25 has a function of learning a dictionary used in detection processing in the detection unit 6 of the information processing device 1 by using the teacher data stored in the storage device 30. A method of learning the dictionary is not particularly limited as long as it is a learning method with teacher data, and the explanation thereof is omitted here.

The dictionary learning device 10 of the first example embodiment is configured as described above. An operation example related to generation of the teacher data in the dictionary learning device 10 will be described below with reference to the flowchart of FIG. 13.

First, in a state where the captured image by the imaging device 40 is displayed on the display device 60, the reference data extraction unit 21 requests the display control unit 26 to display a message or the like prompting an operation of specifying the reference image area and the detection target. When the user specifies the reference image area in the captured image by an operation of the input device 50 in response to the display of the display device 60 by the display control unit 26 responding to the request, the reference data extraction unit 21 acquires information representing the specified reference image area as the reference extraction information. The reference data extraction unit 21 extracts the reference image area Gs from the captured image on the basis of the reference extraction information (step 101 in FIG. 13).

Furthermore, the reference data extraction unit 21 acquires position information of the detection target in the captured image specified by the user, and calculates position information representing the position of the detection target by using the reference point set in the reference image area Gs, on the basis of the acquired information (step S102). The reference data extraction unit 21 thereafter associates the extracted image of the reference image area with the position information representing the position of the detection target, thereby generating teacher data including the image of the reference image area and the position information of the detection target in the reference image area.

After the reference image area is extracted, the enlarged data extraction unit 22 extracts the enlarged image area Ge from the captured image on the basis of the enlargement extraction information in the storage device 30 (step S103). The enlarged data extraction unit 22 then associates the image of the enlarged image area Ge with position information representing the position of the detection target, thereby generating teacher data including the image of the enlarged image area Ge and the position information of the detection target in the enlarged image area Ge.

The reduced data extraction unit 23 extracts the reduced image area Gr from the captured image on the basis of the reduction extraction information in the storage device 30 (step S104). The reduced data extraction unit 23 then associates the image of the reduced image area Gr with position information representing the position of the detection target, thereby generating teacher data including the image of the reduced image area Gr and the position information of the detection target in the reduced image area Gr.

Thereafter, it is determined whether an instruction to end the generation of the teacher data for a basic state based on the reference image area Gs, and the enlarged image area Ge and the reduced image area Gr related to the reference image area Gs is transmitted by an operation of the input device 50 by the user (step S105). When there is no instruction to end, the operations from step 101 are repeated.

When there is an instruction to end, the variation data extraction unit 24 requests the display control unit 26 to display a message or the like prompting the user to perform an operation of specifying the detection target and the variation image area including the object to be recognized in a variation state, together with the captured image by the imaging device 40. When the user specifies the variation image area in the captured image by an operation of the input device 50 in response to the display of the display device 60 by the display control unit 26 responding to the request, the variation data extraction unit 24 acquires information representing the specified variation image area as the variation extraction information. The variation data extraction unit 24 extracts the variation image area from the captured image on the basis of the variation extraction information (step S106). Furthermore, the variation data extraction unit 24 acquires position information of the detection target in the captured image specified by the user, and calculates position information representing the position of the detection target by using the reference point set in the variation image area, on the basis of the acquired information. The variation data extraction unit 24 thereafter associates the extracted image of the variation image area with the position information representing the position of the detection target, thereby generating teacher data including the image of the variation image area and the position information of the detection target in the variation image area.

Thereafter, it is determined whether an instruction to end the generation of the teacher data for the variation state based on the variation image area is transmitted by the operation of the input device 50 by the user (step S107). When there is no instruction to end, the operations from step 106 are repeated. When there is an instruction to end, the generation operation of the teacher data is ended.

Figure 13:
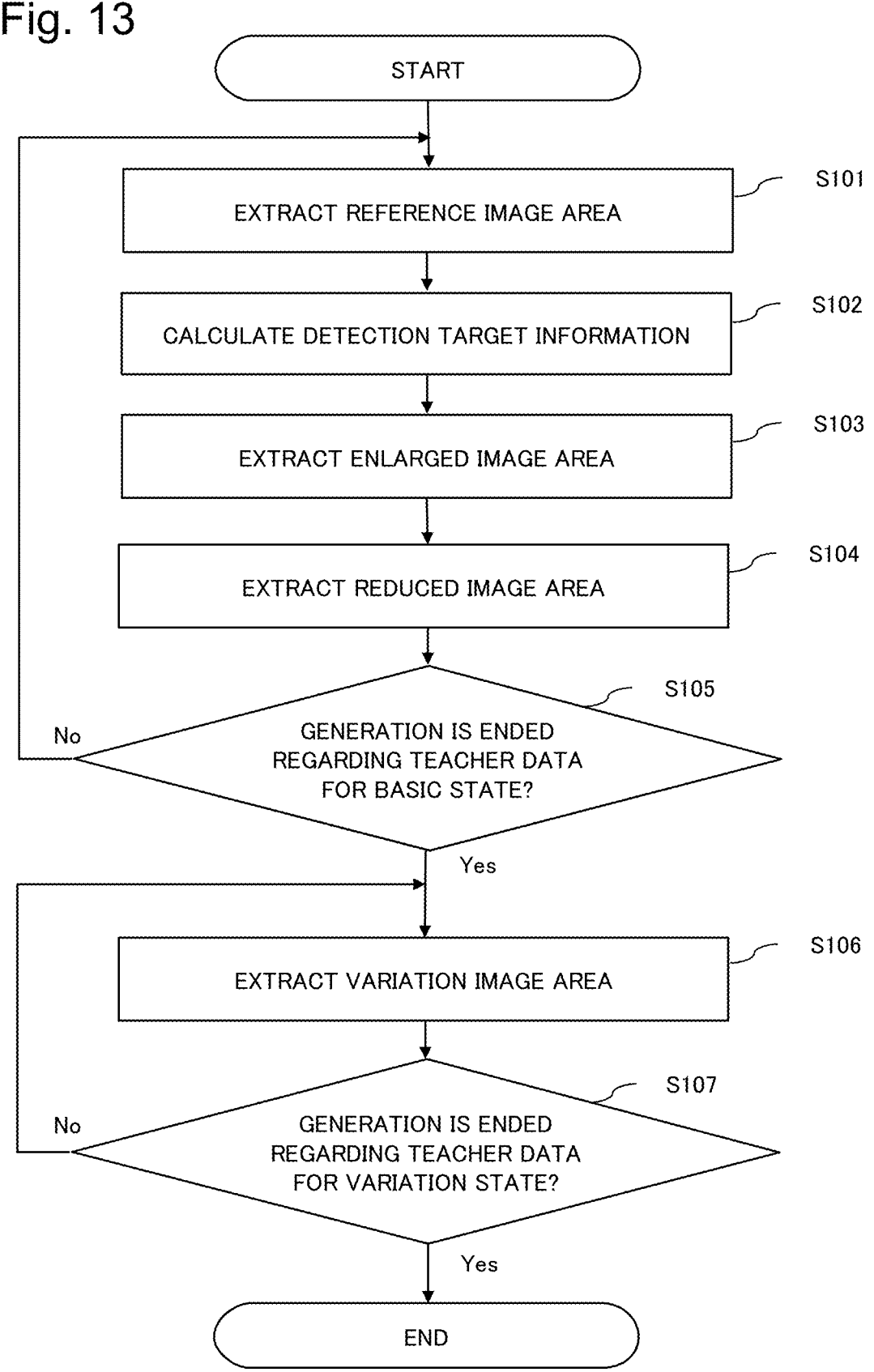
FIG. 13 is a flowchart illustrating an example of operation regarding generation of teacher data in the dictionary learning device of the first example embodiment.

The operation related to the generation of the teacher data in the control device 20 is not limited to be performed in the operation order illustrated in FIG. 13, and the order may be changed as appropriate. For example, after the reduced image area is extracted, the enlarged data extraction unit 22 may extract the enlarged image area. The timing of generating teacher data is set appropriately. For example, after the reference image area Gs, the enlarged image area Ge, and the reduced image area Gr are extracted, each of the teacher data based on the reference image area Gs, the teacher data based on the enlarged image area Ge, and the teacher data based on the reduced image area Gr may be generated.

Furthermore, before the operation of step 103, the control device 20 may cause the user to determine whether the teacher data based on the enlarged image area Ge and the reduced image area Gr is necessary, and when the teacher data is necessary, proceed to the operation of step 103, and when the teacher data is not necessary, proceed to the operation of step 106.

Furthermore, a generation ratio between the teacher data based on the reference image area Gs, the teacher data based on the enlarged image area Ge, and the teacher data based on the reduced image area Gr is appropriately set. For example, the generation ratio is 1:1:1 in consideration of a processing method using the dictionary learned with the teacher data and the background of the object to be recognized in the captured image.

The dictionary learning device 10 of the first example embodiment has the configuration as described above, so that effects can be obtained as described below. That is, the dictionary learning device 10 generates not only the teacher data based on the reference image area Gs, but also the teacher data based on the enlarged image area Ge in which the reference image area Gs is enlarged, and the teacher data based on the reduced image area Gr in which the reference image area Gs is reduced. As a result, the dictionary learning device 10 can increase the number of generated teacher data and variations, so that the reliability of the dictionary can be increased by an increase in the amount of learning and an expansion in the learning content.

Figure 14:
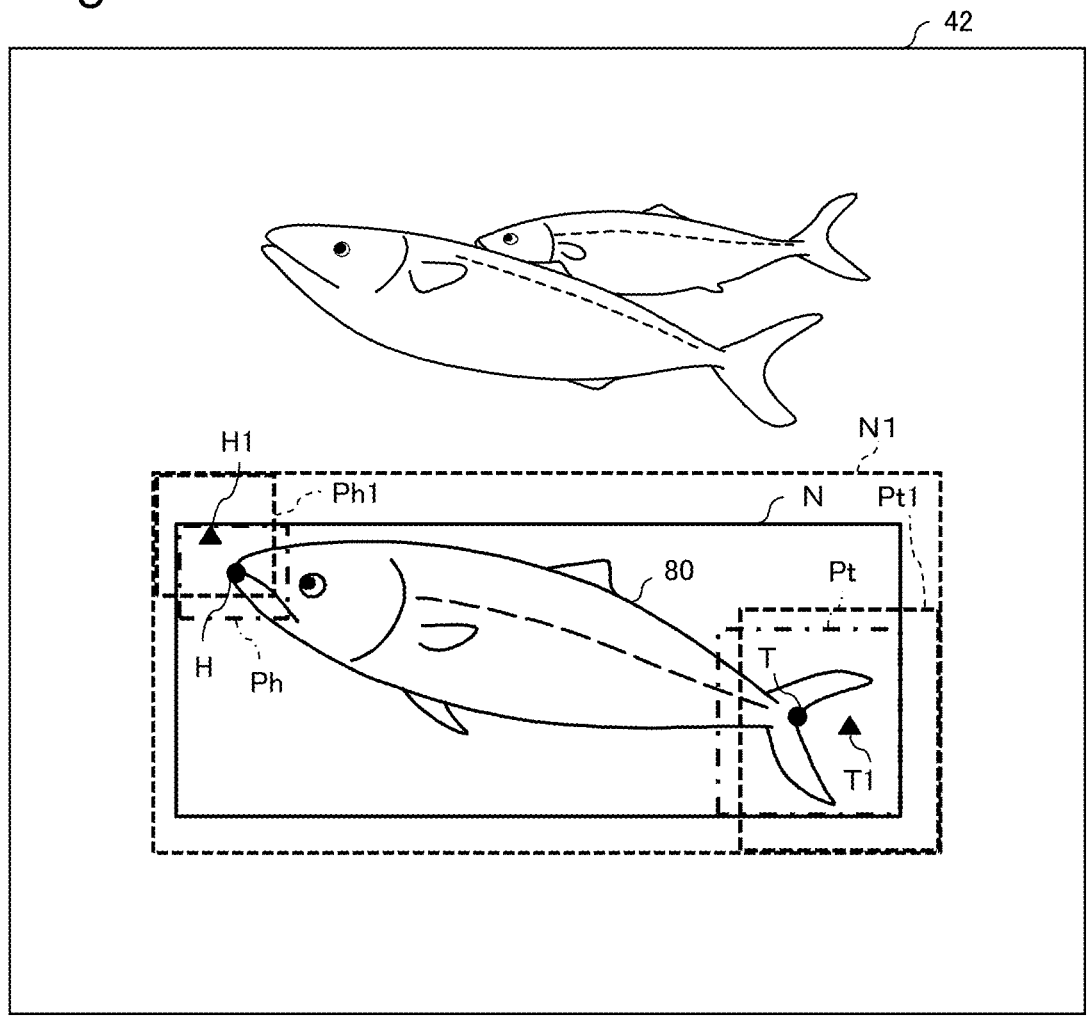
FIG. 14 is a diagram used to describe an effect of the dictionary learning device of the first example embodiment.

It is assumed that the user specifies a processing area N for which processing of detecting the detection target in the object to be recognized (fish 80) is executed, by an operation of the input device 50 in the captured image 42 as illustrated in FIG. 14, for example. It is also assumed that the processing area N is an area for which detection of the detection target can be appropriately processed (that is, an area similar to the reference image area Gs described above). In such a case, the detection unit 6 of the information processing device 1 can correctly detect the detection targets H and T by using the dictionary 5 (here, to make the explanation easier to understand, the description of the detection targets P and B is omitted).

On the other hand, it is assumed that the dictionary learning device 10 does not use the teacher data for the enlarged image area Ge and the reduced image area Gr for learning. The dictionary 5 generated in this case does not reflect information on the teacher data for the enlarged image area Ge and the reduced image area Gr. That is, for example, when information on the partial areas Ph and Pt as described above is given as the information representing the positions of the detection targets H and T, information obtained by learning the partial areas Ph and Pt does not reflect information on the enlarged image area Ge and the reduced image area Gr. For this reason, if the user specifies as the processing area an area N1 that is enlarged from the reference processing area N as illustrated in FIG. 14, enlarged partial areas Ph1 and Pt1 are detected on the basis of the dictionary due to the enlarged area N1. Since the center positions of the partial areas Ph1 and P0 represent the detection targets, the positions of the detection targets H1 and T1 to be detected are shifted from the positions of the correct detection targets H and T due to the enlargement of the partial areas Ph1 and Pt1. Also, when the user specifies as the processing area the area N1 that is reduced from the reference processing area N as illustrated in FIG. 14, the detection targets H and T may not be detected at the correct positions similarly.

The dictionary learning device 10 of the first example embodiment learns the dictionary in consideration of not only the reference image area Gs but also the enlarged image area Ge and the reduced image area Gr. From this fact, the dictionary learning device 10 can provide a dictionary capable of increasing certainty of the detection position of the detection target when a processing area is specified that is enlarged or reduced from the reference area N as described above.

Since the dictionary learning device 10 generates teacher data for the object to be recognized in a variation state by the variation data extraction unit 24 and uses the generated data for learning the dictionary, it is possible to generate a dictionary effective for processing of detecting a detection target from an object to be recognized that moves fast and changes the shape every moment, such as a fish.

Moreover, in the dictionary learning device 10, teacher data is generated when a part of the object to be recognized is not shown in the captured image due to another object as illustrated in FIG. 12, and the teacher data is used for learning the dictionary. In the dictionary learning device 10, teacher data is generated based on an image of a reduced image area in which a part of the object to be recognized is outside the area, and the teacher data is used for learning the dictionary. For this reason, the dictionary learning device 10 can generate a dictionary capable of detecting a detection target in an object to be recognized even when a part of the object to be recognized is not shown in the captured image.

In the above description, when the user specifies an area in the captured image by an operation of the input device 50, the reference data extraction unit 21 uses the specified area as it is as the reference image area. Alternatively, the processing as described below may be executed. For example, the reference data extraction unit 21 executes processing of confirming to the user whether the specified area is the reference image area or the variation image area, and when the specified area is the reference image area, performs processing related to extraction of the reference image area and generation of the teacher data as described above. On the other hand, when the specified area is the variation image area, the reference data extraction unit 21 stops the processing. Instead of the reference data extraction unit 21, the variation data extraction unit 24 uses the specified area as the variation image area, and performs processing related to extraction of the variation image area and generation of the teacher data.

In the above description, the reference image area, the enlarged image area, the reduced image area, and the variation image area have a rectangular shape, but they may have other shapes.

Second Example Embodiment

A second example embodiment according to the present invention will be described below. In the description of the second example embodiment, parts having the same names as those of the constituent parts of the dictionary learning device and the information processing device of the first example embodiment are denoted by the same reference numerals, and redundant description of the common parts is omitted.

Similarly to the first example embodiment, the dictionary learning device of the second example embodiment is a device for learning a dictionary referred to by the control device 2 of the information processing device 1 by a learning method with teacher data, and here, learns a dictionary used in detection processing of detecting one detection target from an object to be recognized. The dictionary learning device of the second example embodiment has a configuration as illustrated in FIG. 1, similarly to the dictionary learning device 10 of the first example embodiment. However, the dictionary learning device 10 of the first example embodiment and the dictionary learning device 10 of the second example embodiment are different from each other as described below due to that the number of detection targets to be detected from the object to be recognized is one.

That is, in the second example embodiment, an image area in which the detection target in the object to be recognized is positioned at the central portion is extracted from the captured image by the dictionary learning device 10 as the reference image area, the enlarged image area, the reduced image area, and the variation image area.

Figure 15:
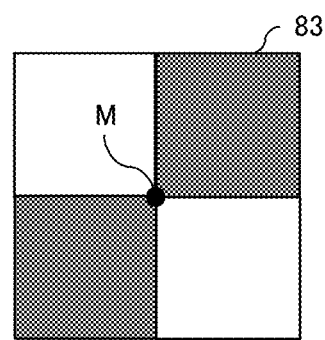
FIG. 15 is a model diagram illustrating a specific example of an object to be recognized and a detection target of the object in a second example embodiment.

As a specific example, it is assumed that the information processing device 1 using the dictionary learned by the dictionary learning device 10 is mounted on a moving body such as a movable robot. It is assumed that the detection unit 6 of the information processing device 1 has a function of detecting the central portion of a mark 83 as illustrated in FIG. 15 as a detection target M in the object to be recognized, and that the processing unit 7 has a function of controlling a moving means to move the moving body toward the detection target M. It is assumed that the dictionary learning device 10 of the second example embodiment learns a dictionary used by the detection unit 6 of such an information processing device 1. A place where the object to be recognized (mark 83) is arranged is not limited, and the object to be recognized (mark 83) is arranged at an appropriate place depending on an application (for example, a wall of a building).

Figure 16:
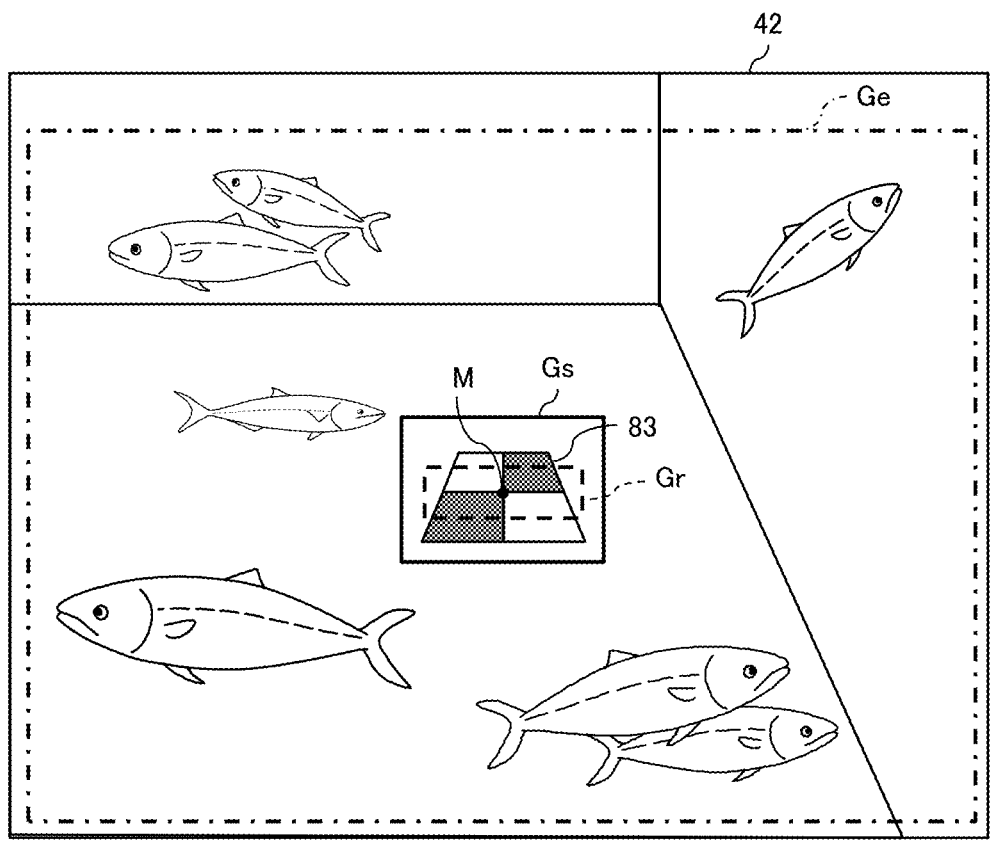
FIG. 16 is a diagram illustrating a specific example of a reference image area, an enlarged image area, and a reduced image area in the second example embodiment.

In such a case, as illustrated in FIG. 16, the reference image area Gs, the enlarged image area Ge, and the reduced image area Gr with the detection target M as the center are extracted from the captured image 42 by the reference data extraction unit 21, the enlarged data extraction unit 22, and the reduced data extraction unit 23, respectively.

That is, for example, in a state where the captured image by the imaging device 40 is displayed on the display device 60, the reference data extraction unit 21 requests the display control unit 26 to display a message or the like prompting the user to perform an operation of specifying the detection target M. It is assumed that the user specifies the detection target (the central portion of the mark 83) M in the captured image by an operation of the input device 50 in response to the display of the display device 60 by the display control unit 26 responding to the request. In this case, the reference data extraction unit 21 further executes processing of causing the user to specify the reference image area Gs with the detection target M as the central portion. The reference image area Gs here is an image area satisfying a reference extraction condition that satisfies all of the following conditions: the detection target M is positioned at the central portion; the entire object to be recognized is included; and entering of a background other than the object to be recognized is suppressed.

Furthermore, when the user specifies the reference image area Gs in the captured image 42 by an operation of the input device 50, the reference data extraction unit 21 acquires information related to the position and size of the specified reference image area Gs in the captured image 42 from the display control unit 26 as reference extraction information. The acquired reference extraction information is stored in the storage device 30 by, for example, the reference data extraction unit 21.

Furthermore, the reference data extraction unit 21 extracts an image of the reference image area Gs from the captured image on the basis of the reference extraction information acquired from the display control unit 26. Moreover, the reference data extraction unit 21 associates the extracted image of the reference image area Gs with position information representing the position of the detection target M specified by the user, thereby generating teacher data including the image of the reference image area Gs and the position information of the detection target in the reference image area Gs. The teacher data thus generated is stored in the storage device 30.

Similarly to the enlarged data extraction unit 22 and the reduced data extraction unit 23 in the first example embodiment, the enlarged data extraction unit 22 and the reduced data extraction unit 23 respectively extract the enlarged image area Ge and the reduced image area Gr from the captured image 42, and further generate teacher data. The generated teacher data is stored in the storage device 30. As described above, in the enlarged image area Ge and the reduced image area Gr to be extracted, the detection target M is positioned at the central portion thereof.

Figure 17:
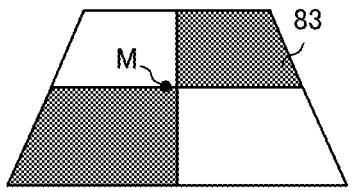
FIG. 17 is a diagram illustrating specific examples of a variation image area in the second example embodiment.

In a state where the captured image by the imaging device 40 is displayed on the display device 60, the variation data extraction unit 24 requests the display control unit 26 to display a message or the like prompting the user to perform an operation of specifying the detection target M in the object to be recognized in the variation state as illustrated in FIG. 17, for example. It is assumed that the user specifies the detection target (the central portion of the mark 83) M in the captured image by an operation of the input device 50 in response to the display of the display device 60 by the display control unit 26 responding to the request. In this case, the variation data extraction unit 24 further executes processing of causing the user to specify a variation image area with the detection target M as the central portion. The variation image area here is an image area satisfying an extraction condition that satisfies all of the following extraction conditions: the detection target M is positioned at the central portion; the entire object to be recognized is included; and entering of a background other than the object to be recognized is suppressed.

Furthermore, when the user specifies the variation image area in the captured image by an operation of the input device 50, the variation data extraction unit 24 acquires information related to the position and size of the specified variation image area in the captured image from the display control unit 26 as variation extraction information. The acquired reference extraction information is stored in the storage device 30 by, for example, the variation data extraction unit 24.

Furthermore, the variation data extraction unit 24 extracts an image of the variation image area from the captured image on the basis of the variation extraction information acquired from the display control unit 26. Moreover, the variation data extraction unit 24 associates the extracted image of the variation image area with position information representing the position of the detection target M specified by the user, thereby generating teacher data including the image of the variation image area and the position information of the detection target in the variation image area. The teacher data thus generated is stored in the storage device 30.

The dictionary learning device 10 of the second example embodiment extracts the reference image area, the enlarged image area, the reduced image area, and the variation image area from the captured image as described above, and learns the dictionary by using the teacher data based on the extracted image areas. The configuration of the dictionary learning device 10 of the second example embodiment other than the above is similar to that of the dictionary learning device 10 of the first example embodiment.

The dictionary learning device 10 of the second example embodiment extracts not only the reference image area Gs but also the enlarged image area Ge and the reduced image area Gr from the captured image to generate the teacher data even when there is only one detection target in the object to be recognized as described above, similarly to the first example embodiment. As a result, similarly to the first example embodiment, the dictionary learning device 10 of the second example embodiment can increase the number of generated teacher data and variations, so that the reliability of the dictionary can be increased by an increase in the amount of learning and an expansion in the learning content. That is, the dictionary learning device 10 of the second example embodiment can increase certainty of the detection position of the detection target detected by the information processing device 1.

If the detection unit 6 of the information processing device 1 performs the detection processing by using a dictionary generated by the dictionary learning device 10 without using the teacher data based on the enlarged image area Ge and the reduced image area Gr, a problem as described below may occur. That is, the problem is that the detection unit 6 cannot detect the detection target although the object to be recognized is shown in the captured image. One of the causes of the problem is considered to be that, for example, when the user specifies an image area to be subjected to the detection processing in the captured image by using the input device 50, the detection target image area is much larger than the object to be recognized and includes a lot of information on the background. Another cause is considered to be that the detection target image area specified by the user does not include the entire object to be recognized.

On the other hand, to cause the dictionary to be learned also in consideration of information on the background in the object to be recognized, the dictionary learning device 10 of the second example embodiment generates teacher data based on the enlarged image area Ge. To cause the dictionary to be learned in consideration of a case where some of the information of the object to be recognized is not included, the dictionary learning device 10 generates teacher data based on the reduced image area Gr. For this reason, the dictionary learning device 10 can generate a dictionary capable of reducing the occurrence of the problem that the detection target cannot be detected as described above. By using the dictionary generated by such a dictionary learning device 10, the information processing device 1 can increase the detection rate of the detection target.

Figure 18:
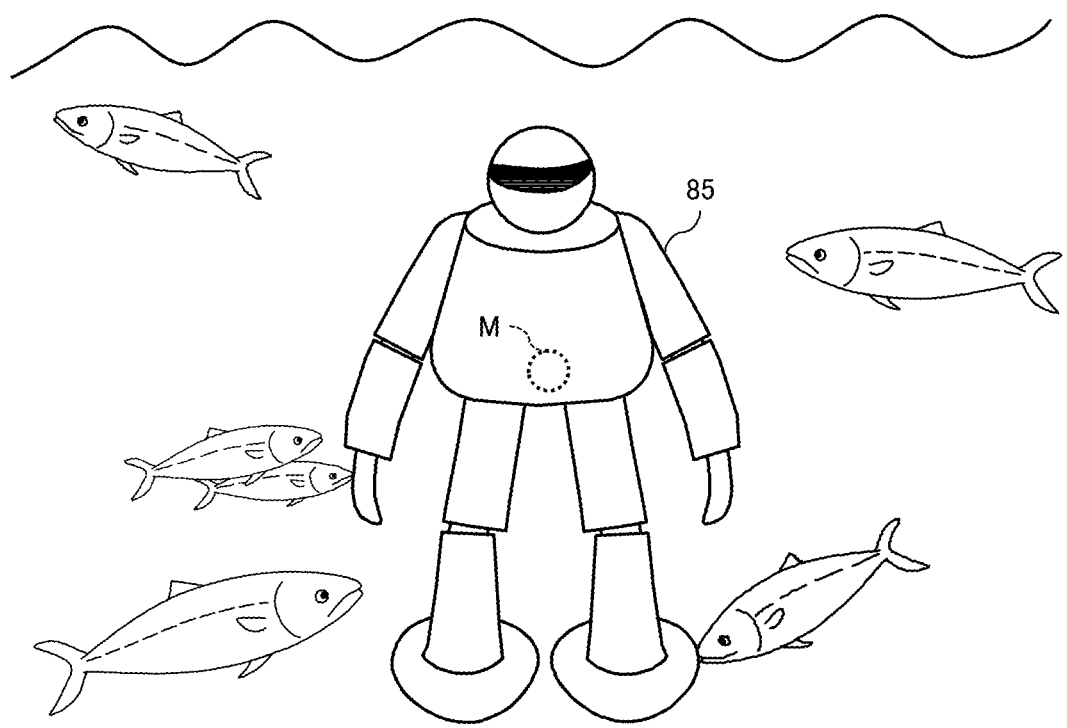
FIG. 18 is a model diagram illustrating yet another specific example of the object to be recognized and the detection target.
Figure 19:
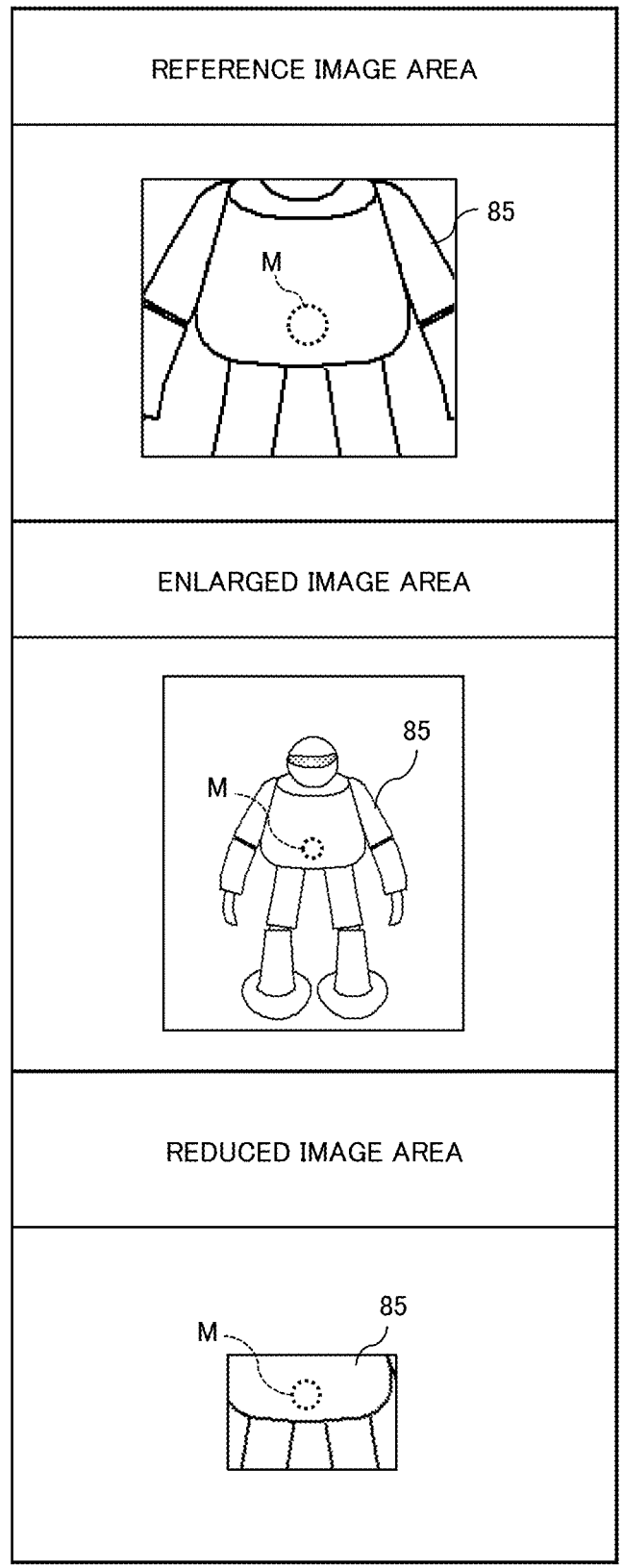
FIG. 19 is a diagram illustrating a specific example of a reference image area, an enlarged image area, and a reduced image area regarding the object to be recognized illustrated in FIG. 18.
Figure 20:
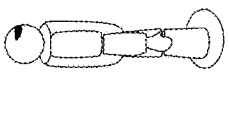
FIG. 20 is a diagram illustrating specific examples of the variation image area regarding the object to be recognized illustrated in FIG. 18.
Figure 20:
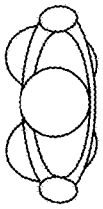
Figure 20:
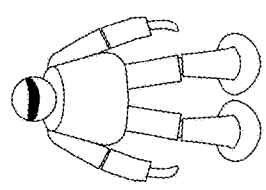
Figure 20:
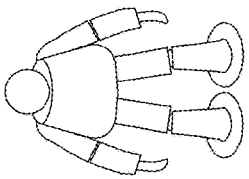
Figure 20:
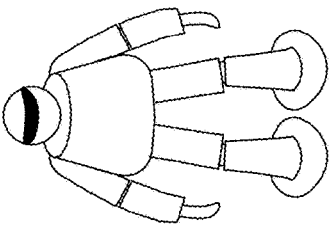
Figure 20:
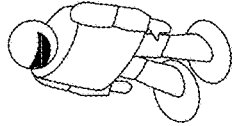
Figure 20:
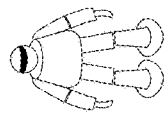

In the second example embodiment, as the object to be recognized, a stationary object as illustrated in FIG. 15 has been described as an example. Alternatively, even if the object to be recognized is a moving object, the dictionary learning device 10 of the second example embodiment can generate a dictionary used by the detection unit 6 of the information processing device 1 similarly to the above. In this case, the detection target is, for example, a portion corresponding to the center of gravity in the object to be recognized. FIG. 18 illustrates an example of the object to be recognized. The object to be recognized in FIG. 18 is a body portion of a humanoid robot 85, and the detection target is a portion M corresponding to the center of gravity of the humanoid robot 85. FIG. 19 illustrates a specific example of images of the reference image area, the enlarged image area, and the reduced image area extracted by the reference data extraction unit 21, the enlarged data extraction unit 22, and the reduced data extraction unit 23 of the control device 20 in the dictionary learning device 10 regarding the object to be recognized in FIG. 18. Also in the specific example, the detection target M is positioned at the central portion of the reference image area, the enlarged image area, and the reduced image area. FIG. 20 illustrates specific examples of the image of the variation image area extracted by the variation data extraction unit 24 regarding the object to be recognized in FIG. 18. Also in images of such variation image areas, a portion corresponding to the center of gravity in the object to be recognized (humanoid robot 85) is positioned at the central portion thereof. By using the dictionary learned by the dictionary learning device 10 by using the teacher data based on the images of various image areas as illustrated in FIGS. 19 and 20, the information processing device 1 can increase the performance of the detection processing of the detection unit 6. For example, it has been confirmed by experiments conducted by the present inventor that the detection unit 6 of the information processing device 1 can detect the position of the humanoid robot 85 even when the leg and one arm of the humanoid robot 85 that is the object to be recognized are hidden by another object. As a result, the information processing device 1 can increase the performance of, for example, processing of tracking the object to be recognized, by the processing unit 7. The object to be recognized that is a moving body such as the humanoid robot 85 is not limited to a moving body that operates in water, but may be a moving body that operates in water, a moving body that can operate both in water and on land, or a moving body that moves or flies in the air or space.

Third Example Embodiment

A third example embodiment according to the present invention will be described below. In the description of the third example embodiment, parts having the same names as those of the constituent parts of the dictionary learning device and the information processing device of the first and second example embodiments are denoted by the same reference numerals, and redundant description of the common parts is omitted.

The dictionary learning device 10 of the third example embodiment has a function of learning a dictionary including reference data used in object recognition processing, in addition to the configuration of the dictionary learning device 10 in the first or second example embodiment. The object recognition processing is processing performed before detection processing in which the detection unit 6 of the control device 2 of the information processing device 1 detects a detection target from an object to be recognized, and is processing of detecting (recognizing) the object to be recognized in a captured image. That is, the dictionary learning device 10 of the third example embodiment learns a dictionary used in the detection unit 6 that executes processing as described below in the information processing device 1.

Figure 23A:
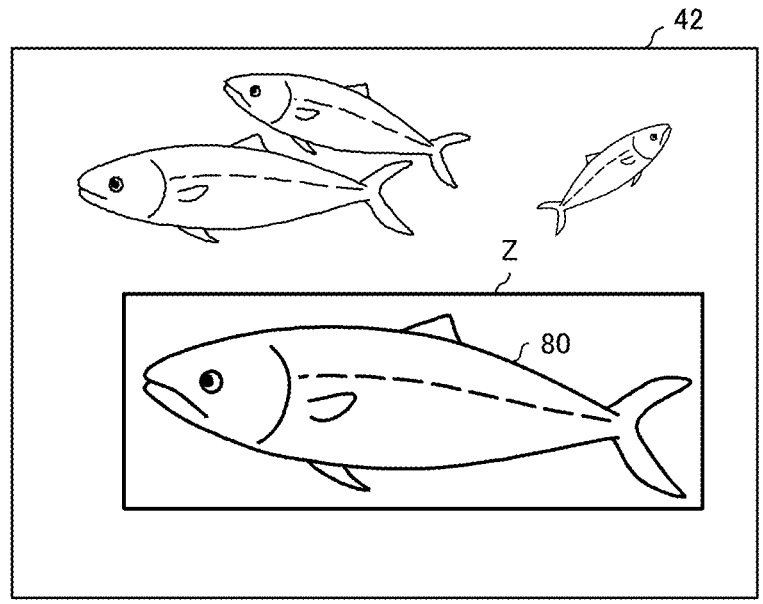
FIG. 23A is a diagram explaining an example of processing of a detection unit included in the information processing device.

That is, the detection unit 6 first detects an object to be recognized (for example, the fish 80) in the captured image 42 as illustrated in FIG. 23A. This processing is the object recognition processing, and here, in the captured image 42, a rectangular image area Z including the object to be recognized (fish 80) is detected by the detection unit 6. In the object recognition processing, the detection unit 6 uses a dictionary (here, referred to as a dictionary 5A (see FIG. 2)) including reference data for object recognition. The dictionary 5A is stored in the storage device 3 of the information processing device 1.

Figure 23B:
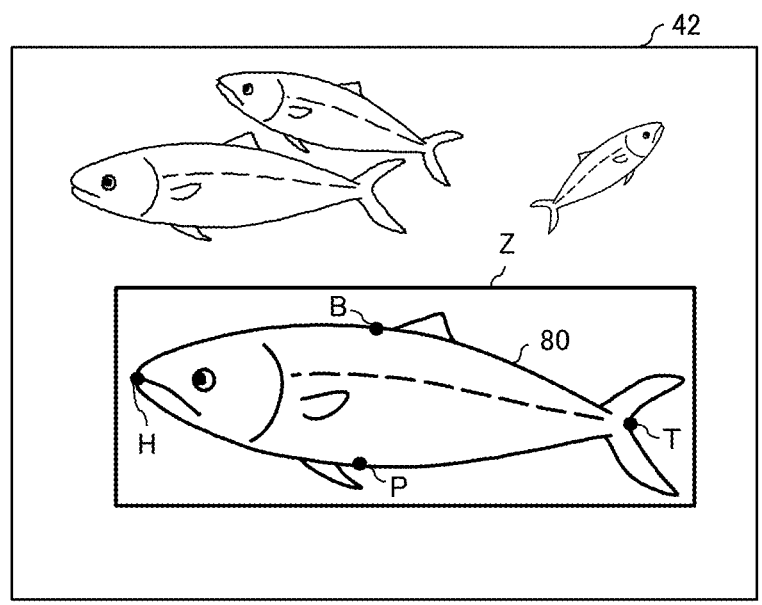
FIG. 23B is a diagram further explaining the example of the processing of the detection unit included in the information processing device.

Thereafter, in the detected image area Z, as illustrated in FIG. 23B, the detection unit 6 detects detection targets (for example, points H, T, P, and B) in the object to be recognized (fish 80). In the detection processing, the detection unit 6 uses a dictionary (here, referred to as a dictionary 5B (see FIG. 2)) including reference data for detection target detection. Similarly to the dictionary 5A, the dictionary 5B is also stored in the storage device 3 of the information processing device 1.

The dictionary learning device 10 in the first and second example embodiments has a function of learning the dictionary 5B used in the processing of detecting the detection targets in the object to be recognized as described above. The dictionary learning device 10 of the third example embodiment has a function of learning the dictionary 5A used in the object recognition processing in addition to the function of learning the dictionary 5B.

Figure 24:
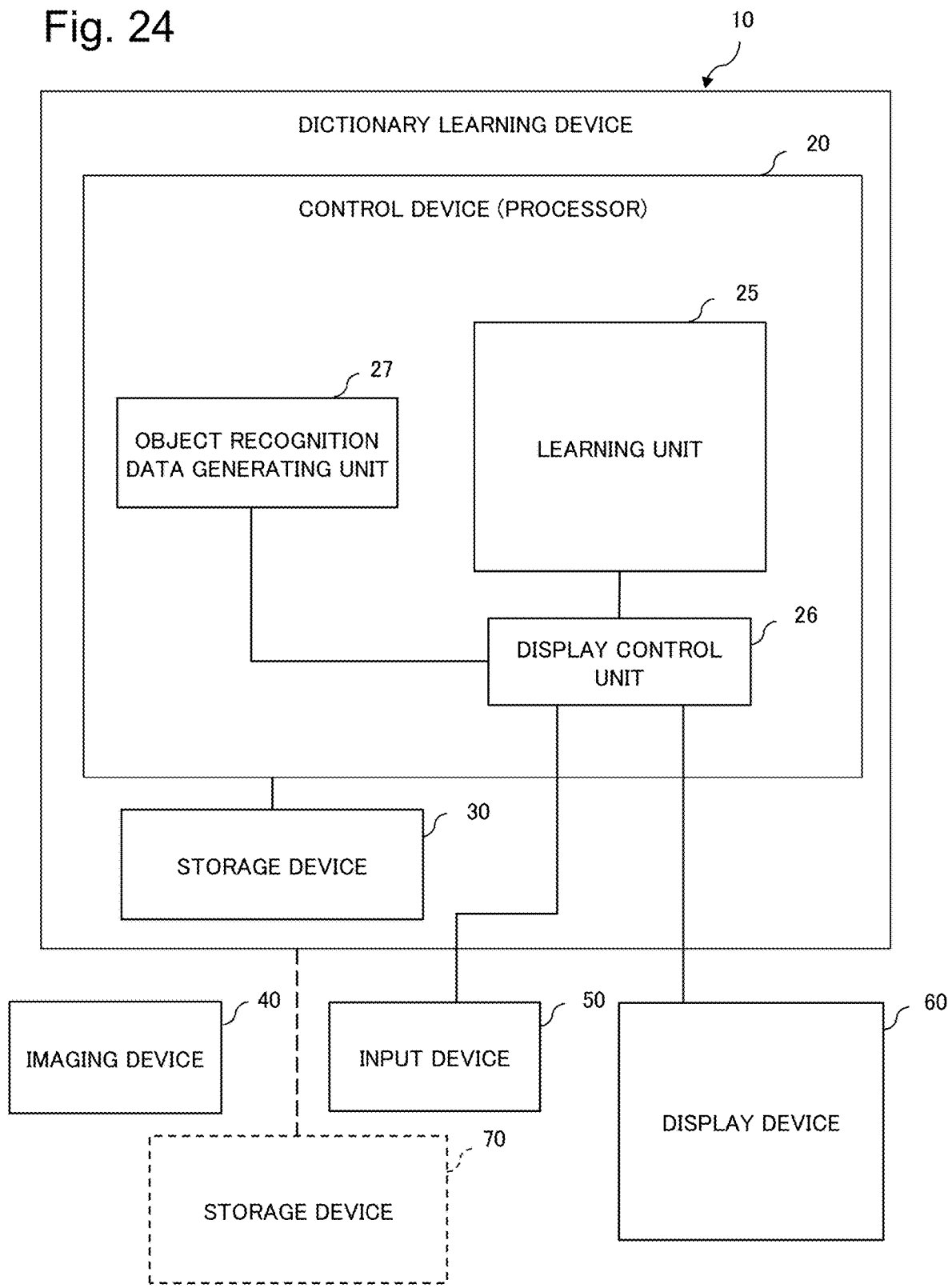
FIG. 24 is a block diagram explaining a configuration of a dictionary learning device of a third example embodiment according to the present invention.

That is, the dictionary learning device 10 of the third example embodiment includes, in addition to the configuration illustrated in FIG. 1, an object recognition data generating unit 27 as illustrated in FIG. 24. In FIG. 24, illustration is omitted of the reference data extraction unit 21, the enlarged data extraction unit 22, the reduced data extraction unit 23, and the variation data extraction unit 24 related to the learning of the dictionary 5B.

Figure 25:
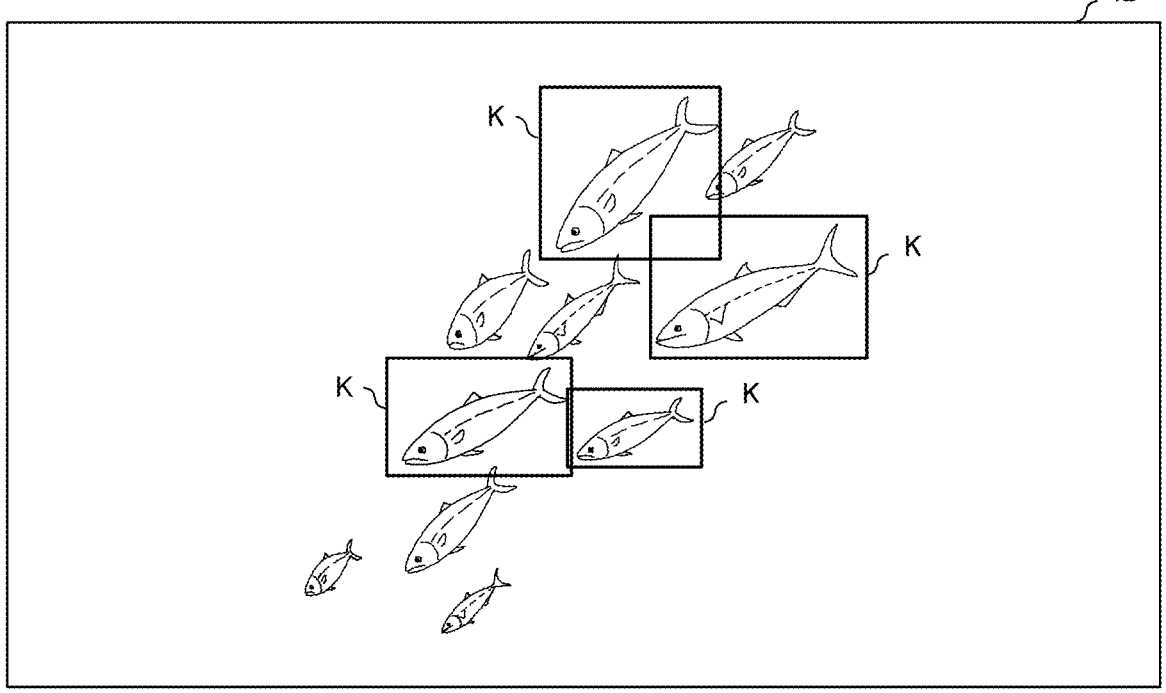
FIG. 25 is a diagram illustrating a specific example of an object to be recognized and an object detection area in a captured image.
Figure 26:
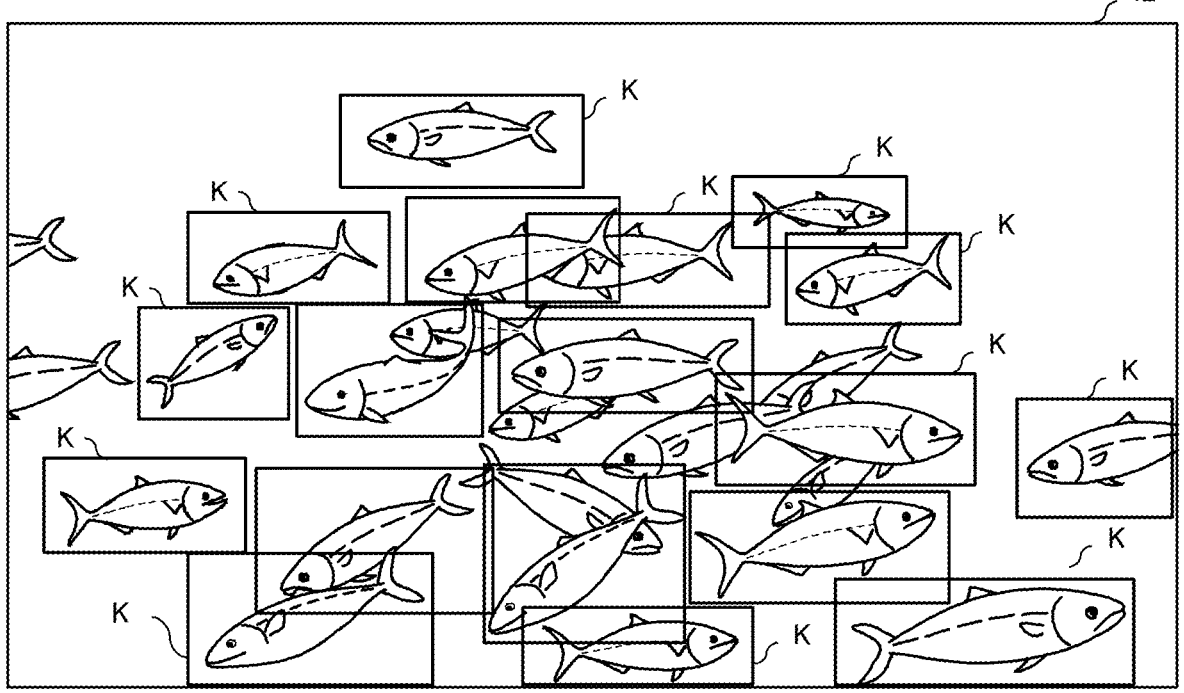
FIG. 26 is a diagram illustrating another specific example of the object to be recognized and the object detection area in the captured image.
Figure 27:
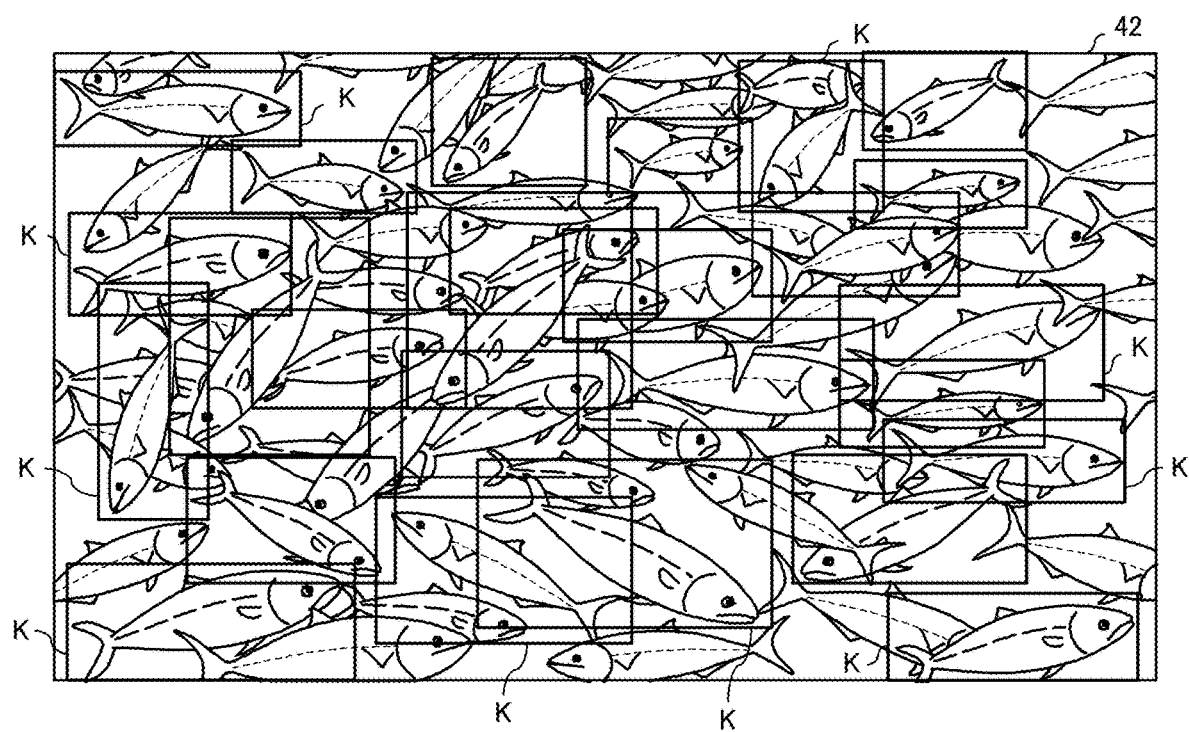
FIG. 27 is a diagram illustrating yet another specific example of the object to be recognized and the object detection area in the captured image.

The object recognition data generating unit 27 has a function of generating teacher data used for the learning of the dictionary 5A. For example, in a state where the captured image by the imaging device 40 is displayed on the display device 60, the object recognition data generating unit 27 requests the display control unit 26 to display a message or the like prompting the user to perform an operation of specifying the object to be recognized. In the third example embodiment, the number of objects to be recognized specified in the captured image is not limited to one, and the display control unit 26 displays on the display device 60 a message or the like prompting the user to specify a plurality of the objects to be recognized depending on the number of objects to be recognized in the captured image. It is assumed that the user operates the input device 50 in response to the display of the display device 60, and an object detection area including the object to be recognized is specified in the captured image. FIGS. 25 to 27 each illustrate a specific example of the captured image in which an object detection area is specified (set). In these specific examples, the object to be recognized is a fish body, and the object detection area including the object to be recognized is specified by a rectangular image area K in the captured image 42. In the third example embodiment, a rectangular frame is displayed in the captured image 42 displayed by the display device 60 to clearly indicate the object detection area K.

As illustrated in the specific examples of FIGS. 25 to 27, the number of object detection areas K specified in the captured image 42 varies depending on an imaging state including the number of objects to be recognized in the captured image 42. That is, as the number of objects to be recognized in the captured image 42 increases, the number of recognizable objects increases, so the number of object detection areas K also increases. However, even if the number of objects to be recognized shown in the captured image 42 is the same, the change tendencies of the number of objects to be recognized in the captured image 42 and the number of object detection areas K does not always have a proportional relationship because of reasons such as that he number of recognizable objects changes due to overlapping of objects.

In the third example embodiment, for example, a message is displayed on the display device 60 so that not only the object to be recognized in the basic posture but also the object to be recognized in a variation state as illustrated in FIG. 11 is specified. As a result, a plurality of objects to be recognized having different sizes, an object to be recognized rotating from the basic posture, an object to be recognized in which a part of the object is varied (for example, a bending fish body or an open-mouthed fish body), and the like are also specified. Furthermore, an object to be recognized close to the imaging device 40, or an object to be recognized far from the imaging device 40, and an object to be recognized partially hidden by another object are also specified.

The object recognition data generating unit 27 associates information of the specified object detection area K as object information with the captured image 42, thereby generating data of the captured image associated with the object information as the teacher data, and stores the generated teacher data in the storage device 30.

The learning unit 25 has a function of generating, by learning, the dictionary 5A used in the object recognition processing in the detection unit 6 of the information processing device 1 by using the teacher data generated by the object recognition data generating unit 27 and stored in the storage device 30. The teacher data used by the learning unit 25 for learning the dictionary 5A is, for example, a lot of data based on captured images in different imaging situations, such as the number of objects to be recognized shown therein, and the sharpness of the image. A method by which the learning unit 25 learns the dictionary 5A is not limited, and the description thereof is omitted here.

Since the dictionary learning device 10 of the third example embodiment has the configuration of the first or second example embodiment, effects similar to those of the first or second example embodiment can be obtained. Furthermore, the dictionary learning device 10 of the third example embodiment can learn the dictionary 5A used in the object recognition processing by the detection unit 6 of the information processing device 1. The dictionary learning device 10 does not use the image of one object to be recognized extracted from the captured image 42 as the teacher data, but instead learns the dictionary 5A by using the data of the entire captured image associated with the object information representing the image area including the object to be recognized for each object as the teacher data. By using the dictionary 5A generated by the learning using such teacher data, in the object recognition processing executed by the detection unit 6 of the information processing device 1, the detection unit 6 can increase the number of objects to be recognized that are recognized (detected) in the captured image 42.

In the above description, the object recognition data generating unit 27 generates the teacher data by associating the information of the object detection area K specified by the user as the object information with the captured image 42. Alternatively, the object recognition data generating unit 27 may generate, as the teacher data, data of the captured image associated with the object information that is the information of the object detection area K, by the processing as described below. For example, it is assumed that object reference data is registered in advance in the storage device 30. The object reference data is, for example, data obtained by learning using an image of an object to be recognized alone extracted from a captured image, as the teacher data. The object recognition data generating unit 27 detects the object to be recognized (object detection area K) in the captured image 42 by using such object reference data. Here, as illustrated in FIGS. 25 to 27, the object recognition data generating unit 27 detects the object detection areas K corresponding to the number of objects to be recognized in the captured image 42. Then, the object recognition data generating unit 27 generates teacher data by associating information of the detected object detection areas K as object information with the captured image 42.

In the third example embodiment, an example has been described in which the learning unit 25 of the dictionary learning device 10 learns the dictionaries 5A and 5B. Alternatively, for example, the learning unit 25 may learn one dictionary by using teacher data respectively generated by the reference data extraction unit 21, the enlarged data extraction unit 22, the reduced data extraction unit 23, the variation data extraction unit 24, and the object recognition data generating unit 27. In this case, the detection unit 6 of the information processing device 1 uses the dictionary to detect the object to be recognized from the captured image, and also detects the detection target in the object to be recognized.

Furthermore, the object to be recognized related to the dictionary generated by the dictionary learning device 10 is not limited to the fish body, the mark, and the humanoid robot used in the description of the first to third example embodiments. Furthermore, in the third example embodiment, an example has been described in which the detection unit 6 of the information processing device 1 detects one type of object to be recognized in the captured image 42 by using the dictionary 5A. Alternatively, for example, the information processing device 1 may include a dictionary 5A_1 used when yellowtail as one of the objects to be recognized is detected by the object recognition processing, and a dictionary 5A_2 used when sea bream as another object to be recognized is detected by the object recognition processing. In this case, by using the dictionaries 5A_1 and 5A_2, the detection unit 6 of the information processing device 1 can detect the yellowtail and the sea bream by type and individually (one by one) from the captured image 42. As described above, when the object recognition processing is executed, the detection unit 6 may detect a plurality of types of objects to be recognized from the captured image by using a plurality of dictionaries.

Furthermore, in the third example embodiment, an example has been described in which the object detection area K is specified over the entire captured image; however, for example, the area in which the object detection area K is specified in the captured image may be limited to an area determined in relation to, for example, calibration processing of the imaging device 40.

Moreover, the dictionary learning device 10 of the third example embodiment has a function of learning both dictionaries of the dictionary 5A and the dictionary 5B. Alternatively, the dictionary learning device 10 may be a device in which the reference data extraction unit 21, the enlarged data extraction unit 22, the reduced data extraction unit 23, and the variation data extraction unit 24 are omitted, and that learns the dictionary 5A.

Another Example Embodiment

Figure 21:
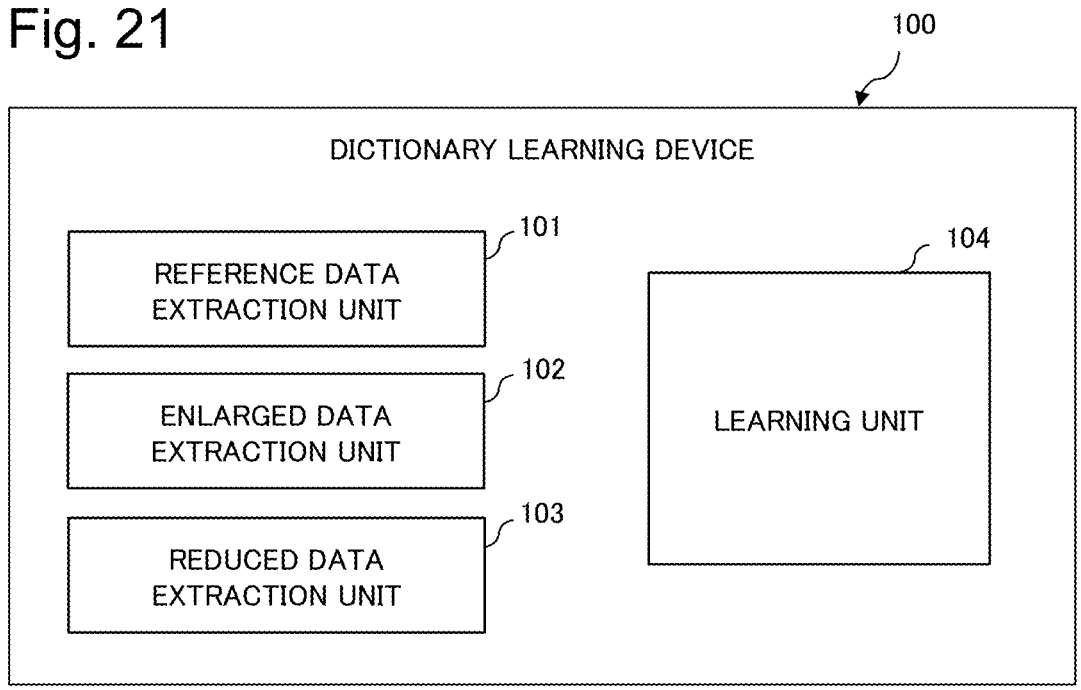
FIG. 21 is a block diagram illustrating a simplified configuration of a dictionary learning device of another example embodiment according to the present invention.
Figure 22:
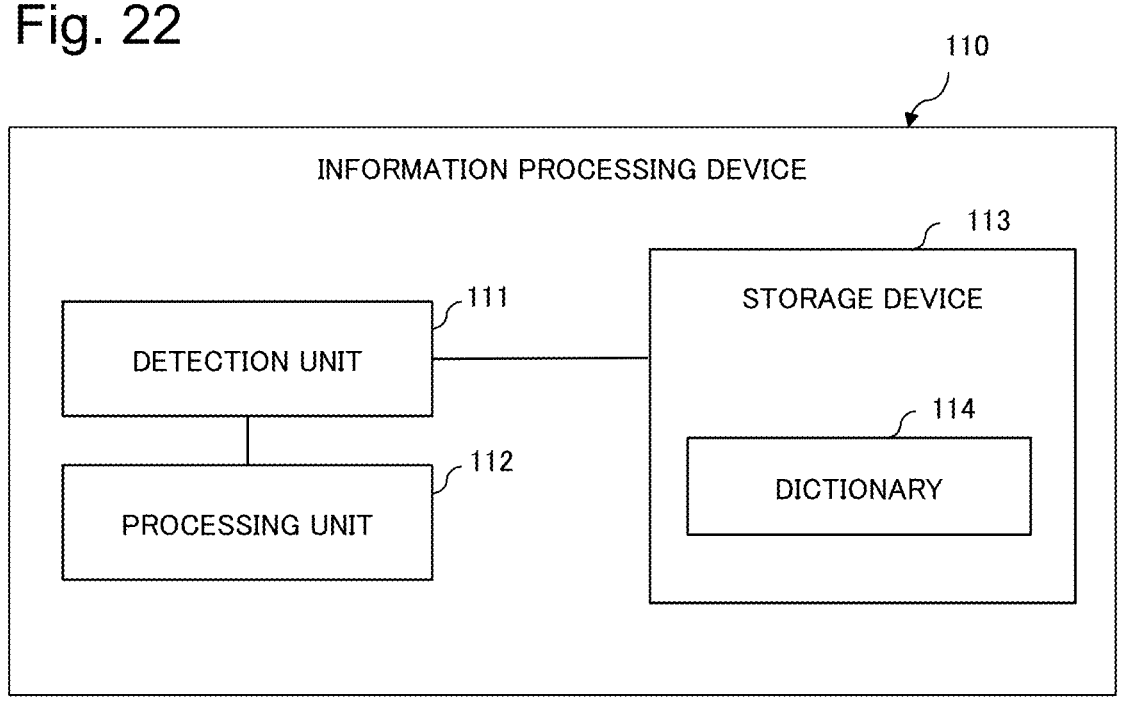
FIG. 22 is a block diagram illustrating a simplified configuration of an information processing device using a dictionary learned by the dictionary learning device illustrated in FIG. 21.

The present invention is not limited to the first to third example embodiments, and can adopt various modes of implementation. For example, FIG. 21 illustrates a block diagram of a configuration of a dictionary learning device of another example embodiment according to the present invention. FIG. 22 illustrates a block diagram of a configuration of an information processing device using a dictionary generated by the dictionary learning device illustrated in FIG. 21. A dictionary learning device 100 in FIG. 21 includes a reference data extraction unit 101, an enlarged data extraction unit 102, a reduced data extraction unit 103, and a learning unit 104. The reference data extraction unit 101 has a function of extracting, from a captured image by an imaging device that images an object to be recognized, an image of a reference image area that includes a detection target in the object to be recognized and serves as a reference, based on reference extraction information. The enlarged data extraction unit 102 has a function of extracting, from the captured image, an image of an enlarged image area that includes the reference image area and is larger than the reference image area, and that includes a background in which an object other than the object to be recognized is shown, based on enlargement extraction information The reduced data extraction unit 103 has a function of extracting, from the captured image, an image of a reduced image area that includes the detection target and is smaller than the reference image area, and in which the object to be recognized is partially outside the image area, based on reduction extraction information. The learning unit 104 has a function of learning a dictionary including reference data to be referred to in detection processing of detecting the detection target from the captured image by using the images of the reference image area, the enlarged image area, and the reduced image area.

An information processing device 110 includes a detection unit 111, a processing unit 112, and a storage device 113. The storage device 113 is a storage device that holds a dictionary 114 learned (generated) by the dictionary learning device 100. The detection unit 111 has a function of detecting the detection target in the object to be recognized from the captured image by the imaging device by using the dictionary 114 of the storage device 113. The processing unit 112 has a function of executing processing using the detected detection target.

The dictionary learning device 100 and the information processing device 110 as described above have the configurations as described above, thereby being able to provide effects similar to those of the first and second example embodiments.

In the above, the present invention has been described with reference to the example embodiments described above as model examples. However, the present invention is not limited to the example embodiments described above. That is, the present invention can apply various modes within the scope of the invention that can be understood by those skilled in the art.

This application is based upon and claims the benefit of priority from Japanese patent application No. 2018-098700, filed on May 23, 2018, and Japanese patent application No. 2018-179775, filed on Sep. 26, 2018, the disclosure of which is incorporated herein in its entirety by reference.

REFERENCE SIGNS LIST 1, 110 Information processing device
3, 30 Storage device
5, 114 Dictionary
6, 111 Detection unit
7, 112 Processing unit
10, 100 Dictionary learning device
21, 101 Reference data extraction unit
22, 102 Enlarged data extraction unit
23, 103 Reduced data extraction unit
24 Variation data extraction unit
27 Object recognition data generating unit
25, 104 Learning unit

What is claimed is:

1. A dictionary learning device comprising:
at least one processor configured to:
extract an image of a reference image area from a captured image based on reference extraction information, the reference image area including a detection target in an object to be recognized and serving as a reference, the captured image being captured by an imaging device that images the object to be recognized;
extract an image of an enlarged image area from the captured image based on enlargement extraction information, the enlarged image area including the reference image area and being larger than the reference image area, and including a background in which an object other than the object to be recognized is shown;
extract an image of a reduced image area from the captured image based on reduction extraction information, the reduced image area including the detection target and being smaller than the reference image area, and being an area in which the object to be recognized is partially outside the reduced image area; and
learn a dictionary including reference data to be referred to in detection processing of detecting the detection target from the captured image by using the images of the reference image area, the enlarged image area, and the reduced image area.

2. The dictionary learning device according to claim 1, wherein the reference image area, the enlarged image area, and the reduced image area each are an image area in which the detection target is positioned at a center of each of the reference image area, the enlarged image area, and the reduced image area.

3. The dictionary learning device according to claim 1, wherein
the reference image area includes a plurality of detection targets different from each other, and
the enlarged image area and the reduced image area each are an image area including the plurality of the detection targets.

4. The dictionary learning device according to claim 3, wherein each of the image areas of the reference image area, the enlarged image area, and the reduced image area includes position information of the detection target that is represented by using a position of a partial area, the partial area is set within the image areas respectively and is an area in which the detection target is positioned at a central portion.

5. The dictionary learning device according to claim 1, wherein the at least one processor is further configured to extract an image of a variation image area from the captured image based on variation extraction information, the variation image area including the object to be recognized in a variation state.

6. The dictionary learning device according to claim 1, wherein the at least one processor is further configured to generate
a plurality of pieces of data of the captured images, each of pieces of data of captured images being associated with object information representing, for each object, an image area including the object to be recognized, and each of pieces of data of the captured images being related to each of the captured images in which a number of pieces of the object information differs depending on an imaging state of the object to be recognized, wherein
the at least one processor learns a dictionary including reference data to be referred in object recognition processing of detecting the object to be recognized, by using the plurality of pieces of data of the captured images to which the object information is added.

7. A dictionary learning method, with a computer, comprising:
extracting an image of a reference image area from a captured image based on reference extraction information, the reference image area including a detection target in an object to be recognized and serving as a reference, the captured image being captured by an imaging device that images the object to be recognized;
extracting an image of an enlarged image area from the captured image based on enlargement extraction information, the enlarged image area including the reference image area and being larger than the reference image area, and including a background in which an object other than the object to be recognized is shown;
extracting an image of a reduced image area from the captured image based on reduction extraction information, the reduced image area including the detection target and being smaller than the reference image area, and being an area in which the object to be recognized is partially outside the reduced image area; and
learning a dictionary including reference data to be referred to in detection processing of detecting the detection target from the captured image by using the images of the reference image area, the enlarged image area, and the reduced image area.

8. A non-transitory computer readable storage medium containing program instructions for causing a computer to execute:
extracting an image of a reference image area from a captured image based on reference extraction information, the reference image area including a detection target in an object to be recognized and serving as a reference, the captured image being captured by an imaging device that images the object to be recognized;
extracting an image of an enlarged image area from the captured image based on enlargement extraction information, the enlarged image area including the reference image area and being larger than the reference image area, and including a background in which an object other than the object to be recognized is shown;
extracting an image of a reduced image area from the captured image based on reduction extraction information, the reduced image area including the detection target and being smaller than the reference image area, and being an area in which the object to be recognized is partially outside the reduced image area; and
learning a dictionary including reference data to be referred to in detection processing of detecting the detection target from the captured image by using the images of the reference image area, the enlarged image area, and the reduced image area.

* * * * *